(12) United States Patent
Treible, Jr. et al.

(10) Patent No.: US 10,260,722 B2
(45) Date of Patent: Apr. 16, 2019

(54) SENSOR MODULES FOR LIGHT FIXTURES

(71) Applicant: Cooper Technologies Company, Houston, TX (US)

(72) Inventors: Daniel Robert Treible, Jr., Liverpool, NY (US); Andrew Francis Scarlata, West Monroe, NY (US); Joseph Michael Manahan, Manlius, NY (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 15/723,931

(22) Filed: Oct. 3, 2017

(65) Prior Publication Data

US 2018/0160509 A1    Jun. 7, 2018

Related U.S. Application Data

(60) Provisional application No. 62/429,580, filed on Dec. 2, 2016.

(51) Int. Cl.
*H05B 33/08* (2006.01)
*F21V 25/12* (2006.01)
(Continued)

(52) U.S. Cl.
CPC ............ *F21V 25/12* (2013.01); *F21V 5/04* (2013.01); *F21V 15/01* (2013.01); *F21V 17/02* (2013.01);
(Continued)

(58) Field of Classification Search
CPC ... F21V 3/00; F21V 5/04; F21V 15/01; F21V 17/02; F21V 17/107; F21V 19/0015;
(Continued)

(56) References Cited

U.S. PATENT DOCUMENTS 5,578,905 A    11/1996    Graber
5,890,797 A    4/1999    Bish
(Continued)

FOREIGN PATENT DOCUMENTS

CN    201443739    4/2010
CN    201954375    8/2011
(Continued)

OTHER PUBLICATIONS

S. Surikov, International Search Report and Written Opinion issued in application No. PCT/US2017/064443, completion date Apr. 28, 2018, dated May 10, 2018, 7 pages, Federal Institute of Industrial Property, Moscow, Russia.
(Continued)

*Primary Examiner* — Alexander H Taningco
*Assistant Examiner* — Kurtis R Bahr
(74) *Attorney, Agent, or Firm* — King & Spalding LLP

(57) ABSTRACT

A lighting system can include a light fixture located in a hazardous environment, wherein the light fixture comprises a controller. The light fixture can also include a sensor module communicably coupled to the controller of the light fixture, wherein the sensor module comprises a sensor module housing and a sensor disposed within the sensor module housing, wherein the sensor module housing comprises a first coupling feature that couples to a hazardous location enclosure. The hazardous location enclosure and the sensor module, when coupled to each other, can comply with applicable standards for the hazardous environment.

19 Claims, 25 Drawing Sheets

(51) Int. Cl.

| | |
|---|---|
| *F21V 29/77* | (2015.01) |
| *F21V 29/83* | (2015.01) |
| *F21V 15/01* | (2006.01) |
| *F21V 17/02* | (2006.01) |
| *F21V 17/10* | (2006.01) |
| *F21V 23/06* | (2006.01) |
| *G01V 8/12* | (2006.01) |
| *H05B 37/02* | (2006.01) |
| *F21V 19/00* | (2006.01) |
| *H01Q 1/00* | (2006.01) |
| *F21V 5/04* | (2006.01) |
| *H01Q 1/42* | (2006.01) |
| *H01Q 19/06* | (2006.01) |
| *F21V 3/00* | (2015.01) |
| *F21V 31/00* | (2006.01) |
| *F21V 23/04* | (2006.01) |
| *F21Y 115/10* | (2016.01) |

(52) U.S. Cl.
CPC ........ *F21V 17/107* (2013.01); *F21V 19/0015* (2013.01); *F21V 23/06* (2013.01); *F21V 29/77* (2015.01); *F21V 29/773* (2015.01); *F21V 29/83* (2015.01); *G01V 8/12* (2013.01); *H01Q 1/002* (2013.01); *H01Q 1/42* (2013.01); *H01Q 19/06* (2013.01); *H05B 33/0845* (2013.01); *H05B 37/0218* (2013.01); *H05B 37/0227* (2013.01); *H05B 37/0245* (2013.01); *H05B 37/0272* (2013.01); *H05B 37/0281* (2013.01); *F21V 3/00* (2013.01); *F21V 23/0471* (2013.01); *F21V 31/005* (2013.01); *F21Y 2115/10* (2016.08)

(58) Field of Classification Search
CPC ...... F21V 23/0471; F21V 23/06; F21V 25/12; F21V 29/77; F21V 29/773; F21V 29/83; F21V 31/005; F21Y 2115/10; G01V 8/12; H01Q 1/002; H05B 33/0845; H05B 37/0218; H05B 37/0227; H05B 37/0245; H05B 37/0272; H05B 37/0281
See application file for complete search history.

(56) References Cited

U.S. PATENT DOCUMENTS

| | | | |
|---|---|---|---|
| 6,034,325 A | 3/2000 | Nattel et al. | |
| 6,091,200 A | 7/2000 | Lenz | |
| 6,196,705 B1 | 3/2001 | Finke et al. | |
| D592,799 S | 5/2009 | Scott | |
| 7,648,373 B2 | 1/2010 | Dixon et al. | |
| 7,741,782 B2 | 6/2010 | Vermeulen et al. | |
| 7,828,463 B1 | 11/2010 | Willis | |
| 7,862,202 B2 | 1/2011 | Laso et al. | |
| D639,500 S | 6/2011 | Choi et al. | |
| 7,965,336 B2 | 6/2011 | Bingle et al. | |
| 7,985,017 B2 | 7/2011 | Quan et al. | |
| D646,016 S | 9/2011 | Choi et al. | |
| 8,053,728 B2 | 11/2011 | Chrzan et al. | |
| D656,262 S | 3/2012 | Yoshinobu et al. | |
| D656,263 S | 3/2012 | Ogawa et al. | |
| 8,167,453 B2 | 5/2012 | Kawashima et al. | |
| 8,232,909 B2 * | 7/2012 | Kroeger | F21V 23/0442 340/500 |
| D672,480 S | 12/2012 | Maxik et al. | |
| D684,286 S | 6/2013 | Rashidi | |
| 8,636,385 B2 | 1/2014 | Fabbri et al. | |
| D699,889 S | 2/2014 | Yasuji Fletcher et al. | |
| 8,657,626 B2 | 2/2014 | Duval et al. | |
| D700,991 S | 3/2014 | Johnson et al. | |
| 8,796,610 B2 | 8/2014 | Williams et al. | |
| 8,901,825 B2 | 12/2014 | Reed | |
| 9,163,814 B2 | 10/2015 | Plunk et al. | |
| 9,310,060 B2 | 4/2016 | Stolte et al. | |
| 9,433,062 B2 | 8/2016 | Reed | |
| 9,442,215 B2 * | 9/2016 | Kovacs | F21V 23/0471 |
| D776,836 S | 1/2017 | Tang | |
| 9,565,732 B2 | 2/2017 | Ryhorchuk et al. | |
| 9,626,847 B2 * | 4/2017 | Spiro | G08B 7/066 |
| 9,709,725 B2 | 7/2017 | Wilcox et al. | |
| 9,713,228 B2 | 7/2017 | Reed | |
| D802,197 S | 11/2017 | Ding et al. | |
| D803,427 S | 11/2017 | Germain | |
| D809,176 S | 1/2018 | Partington | |
| D822,859 S | 7/2018 | Wang et al. | |
| 2004/0183744 A1 | 9/2004 | Raiman | |
| 2005/0183344 A1 | 8/2005 | Ziobro et al. | |
| 2008/0062705 A1 * | 3/2008 | Czech | F21S 8/02 362/364 |
| 2010/0270933 A1 | 10/2010 | Chemel et al. | |
| 2011/0194280 A1 | 8/2011 | Ruffin, Jr. et al. | |
| 2012/0040606 A1 | 2/2012 | Verfuerth | |
| 2012/0206050 A1 * | 8/2012 | Spero | B60Q 1/04 315/152 |
| 2012/0274208 A1 | 11/2012 | Chen et al. | |
| 2013/0021808 A1 | 1/2013 | Harbers et al. | |
| 2013/0200807 A1 | 8/2013 | Mohan et al. | |
| 2013/0314921 A1 | 11/2013 | Chen | |
| 2014/0021884 A1 | 1/2014 | Fetterly et al. | |
| 2014/0085912 A1 * | 3/2014 | David | F21S 8/026 362/419 |
| 2014/0239821 A1 | 8/2014 | Leonard | |
| 2015/0285480 A1 | 10/2015 | Chien et al. | |
| 2015/0338074 A1 | 11/2015 | Chen et al. | |
| 2015/0351195 A1 | 12/2015 | Sargent et al. | |
| 2016/0356474 A1 * | 12/2016 | Jayawardena | F21V 25/10 |
| 2017/0031085 A1 | 2/2017 | Lim et al. | |
| 2017/0079121 A1 * | 3/2017 | Jayawardena | H05B 37/0272 |
| 2017/0135180 A1 | 5/2017 | Broers et al. | |
| 2017/0156189 A1 * | 6/2017 | Jayawardena | H05B 33/0884 |
| 2017/0178497 A1 | 6/2017 | John et al. | |
| 2017/0184659 A1 * | 6/2017 | Jayawardena | G01R 31/2635 |

FOREIGN PATENT DOCUMENTS

| | | |
|---|---|---|
| CN | 202432348 | 9/2012 |
| CN | 204241458 | 4/2015 |
| WO | 2013111134 | 8/2013 |
| WO | 2016176455 | 11/2016 |

OTHER PUBLICATIONS

Translation of CN202432348 via LexisNexis Total Patents, Jun. 6, 2018, 6 pages.
Translation of CN201954375 via LexisNexis Total Patents, Jun. 6, 2018, 4 pages.
Translation of CN201443739 via LexisNexis Total Patents, Jun. 6, 2018, 6 pages.
V. Surikov, International Search Report and Written Opinion issued in application No. PCT/US2017/054961, completion date Jan. 15, 2018, dated Jan. 18, 2018, 8 pages, Federal Institute of Industrial Property, Moscow, Russia.
S. Surikov, International Search Report and Written Opinion issued in application No. PCT/US2017/054957, completion date Dec. 25, 2017, dated Jan. 25, 2018, 9 pages, Federal Institute of Industrial Property, Moscow, Russia.
Cooper Lighting by Eaton ,"LED Roadway and Area Luminaire", Navion—Streetworks, Mar. 2014, 12 pages, Eaton's Cooper Lighting Business, Peachtree, Georgia, USA, http://www.cooperindustries.com/content/dam/public/lighting/resources/library/literature/Streetworks/streetworks-navion-bro.pdf.
The Zhaga Consortium, "Versatile interface for outdoor luminaires",The Zhaga Consortium presented in a webinar, Feb. 18, 2016, 25 pages, www.zhagastandard.org., file:///C:/Users/Admin/Downloads/1602_zhaga-webinar_connector-proposal-mc_final.pdf.
Machine translation of CN204241458 via LexisNexis Total Patents, Sep. 28, 2017, 4 pages.

(56) References Cited

OTHER PUBLICATIONS

I. Istomin, International Search Report and Written Opinion issued in application No. PCT/US2017/064438, completion date Mar. 13, 2018, dated Mar. 22, 2018, 8 pages, Federal Institute of Industrial Property, Moscow, Russia.

\* cited by examiner

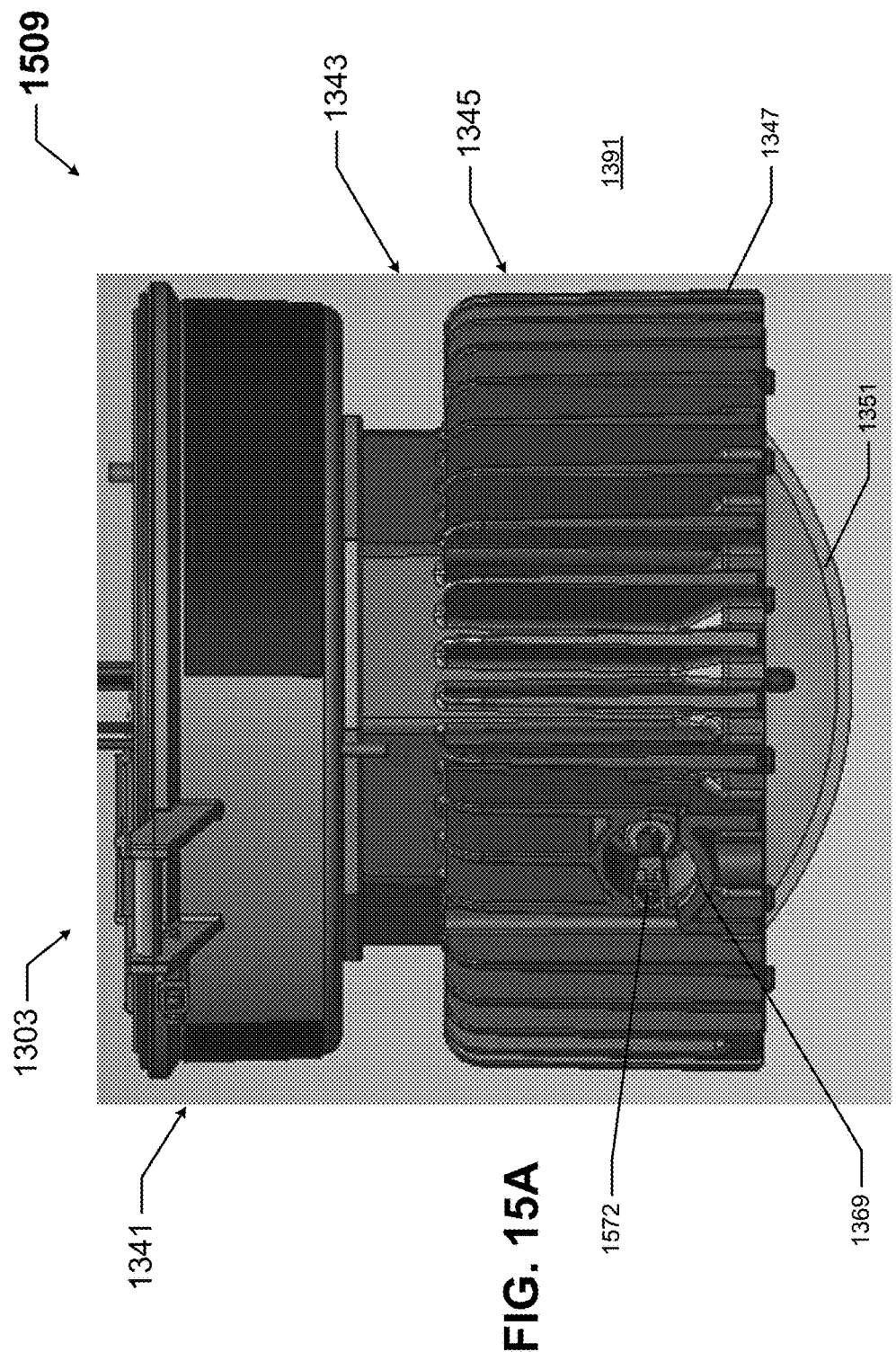

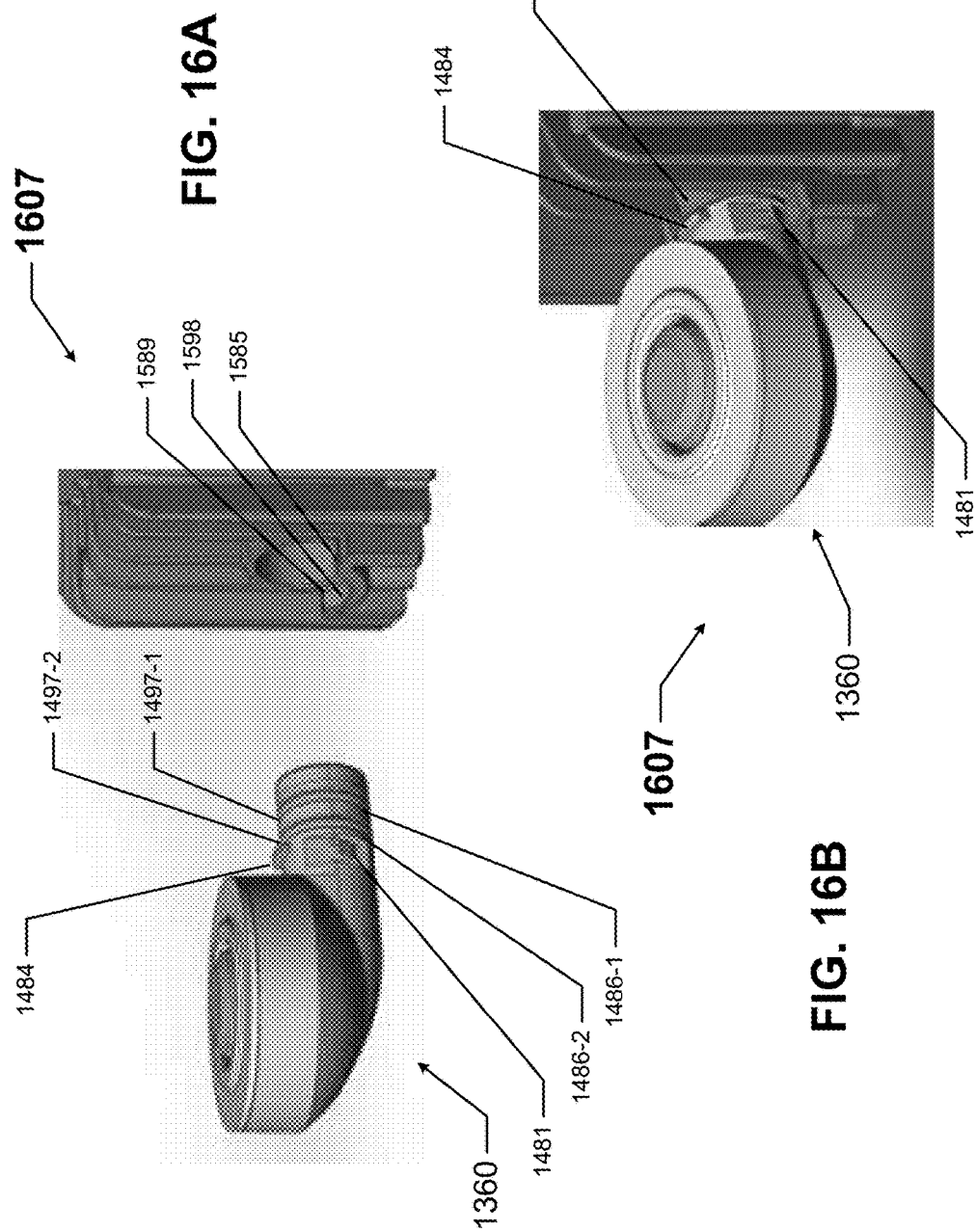

SENSOR MODULES FOR LIGHT FIXTURES

CROSS-REFERENCE TO RELATED APPLICATIONS

This application claims priority to U.S. Provisional Patent Application Ser. No. 62/429,580, titled "Hazardous Location Light Fixtures" and filed on Dec. 2, 2016, which is related to U.S. patent application Ser. No. 15/382,143, titled "Prognostic and Health Monitoring Systems For Light Fixtures" and filed on Dec. 16, 2016. The entire contents of these aforementioned applications are hereby incorporated herein by reference.

TECHNICAL FIELD

The present disclosure relates generally to light fixtures, and more particularly to systems, methods, and devices for light fixtures with sensor modules.

BACKGROUND

Light fixtures are used in a variety of environments. Many of these light fixtures use advanced technology with a number of components. As a result, these light fixtures can have a number of failure points. In lighting applications, such as hazardous environments, reliability of the lighting system is vital. Unfortunately, the characteristics (e.g., humidity, extreme temperatures, corrosive gas) of many environments, including but not limited to hazardous environments, can cause the failure of one or more components of a light fixture to be accelerated. Further, the health and safety of a person located in such an environment can be at risk, with or without the person's knowledge. When a light fixture is placed in certain environments, such as a hazardous environment, some of these components of a light fixture can pose a safety hazard and a violation of applicable standards if the components are not properly engineered and integrated with the rest of the light fixture.

SUMMARY

In general, in one aspect, the disclosure relates to a lighting system. The lighting system can include a light fixture located in a hazardous environment, wherein the light fixture comprises a controller. The lighting system can also include a sensor module communicably coupled to the controller of the light fixture, wherein the sensor module comprises a sensor module housing and a sensor disposed within the sensor module housing, wherein the sensor module housing comprises a first coupling feature that couples to a hazardous location enclosure. The hazardous location enclosure and the sensor module, when coupled to each other, can comply with applicable standards for the hazardous environment.

In another aspect, the disclosure can generally relate to a lighting system. The lighting system can include a first fixture housing of a first light fixture, where the first fixture housing includes a first mounting feature. The lighting system can also include a sensor module removably coupled to the first fixture housing, where the sensor module includes a sensor module housing and a sensor disposed within the sensor module housing, where the sensor module housing includes a first coupling feature that couples to the first mounting feature of the first fixture housing. The sensor device can be adjustable relative to the first fixture housing.

In yet another aspect, the disclosure can generally relate to a sensor module that couples to a housing of a light fixture. The sensor module can include a housing having at least one wall that forms a cavity. The sensor module can also include a sensor disposed within the cavity, where the sensor is configured to measure at least one parameter used to control operation of the light fixture. The sensor module can further include a bezel coupled to the housing, where the bezel has an aperture that traverses therethrough. The sensor module can also include a lens disposed within the aperture, and a mount disposed within the cavity and coupled to the bezel, where the sensor is supported by the mount. The sensor module can further include a circuit board disposed within the cavity and electrically coupled to the sensor.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

FIGS. 15A and 15B show part of the light fixture of FIGS. 13A and 13B in accordance with certain example embodiments.

FIGS. 16A-16H show detailed views of the light fixture of FIGS. 13A and 13B in accordance with certain example embodiments.

DETAILED DESCRIPTION

Figure 1:
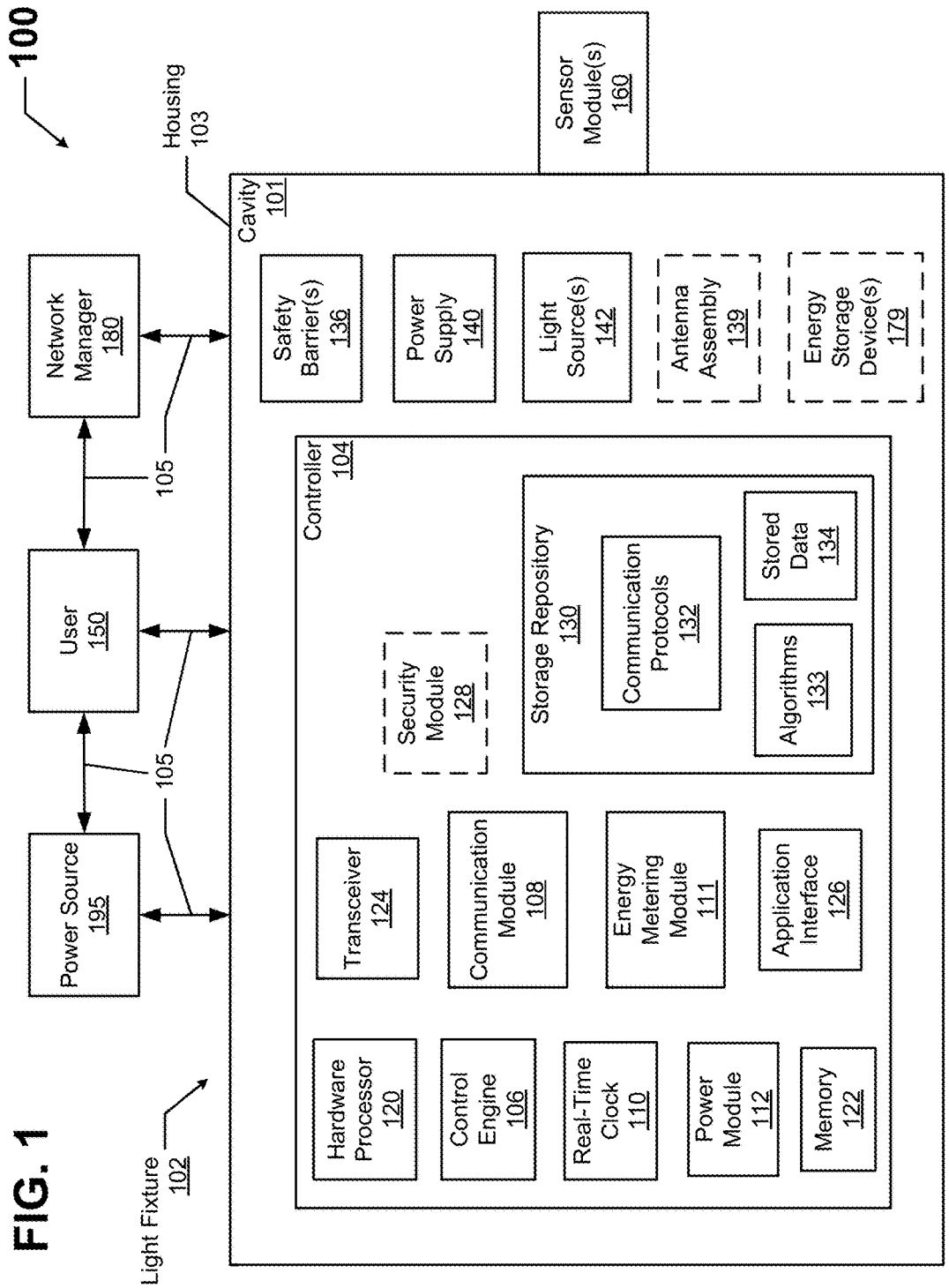
FIG. 1 shows a system diagram of a lighting system that includes a light fixture in accordance with certain example embodiments.

In general, example embodiments provide systems, methods, and devices for light fixtures with sensor modules. Example light fixtures with sensor modules provide a number of benefits. Such benefits can include, but are not limited to, preventing abrupt failure of light fixtures in critical applications, longer useful life of light fixtures, improved safety in areas where example light fixtures are located, reduced operating costs, adjustability for optimal performance, and compliance with industry standards that apply to light fixtures located in certain environments.

In some cases, the example embodiments discussed herein can be used in a hazardous environment. In such a case, example embodiments can be located in any type of hazardous environment, including but not limited to an airplane hangar, a drilling rig (as for oil, gas, or water), a production rig (as for oil or gas), a refinery, a chemical plant, a power plant, a mining operation, a wastewater treatment facility, and a steel mill. A hazardous environment can include an explosion-proof environment, which would require an enclosure with an example moisture control system to meet one or more requirements, including but not limited to flame paths.

An explosion-proof enclosure is a type of hazardous location enclosure. In one or more example embodiments, an explosion-proof enclosure (also known as a flame-proof enclosure) is an enclosure that is configured to contain an explosion that originates inside the enclosure. Further, the explosion-proof enclosure is configured to allow gases from inside the enclosure to escape across joints of the enclosure and cool as the gases exit the explosion-proof enclosure. The joints are also known as flame paths and exist where two surfaces meet and provide a path, from inside the explosion-proof enclosure to outside the explosion-proof enclosure, along which one or more gases may travel. A joint may be a mating of any two or more surfaces. Each surface may be any type of surface, including but not limited to a flat surface, a threaded surface, and a serrated surface. In some cases, the housing of a light fixture that couples to an example sensor can be considered an explosion-proof enclosure.

In one or more example embodiments, an explosion-proof enclosure is subject to meeting certain standards and/or requirements. For example, NEMA sets standards with which an enclosure must comply in order to qualify as an explosion-proof enclosure. Specifically, NEMA Type 7, Type 8, Type 9, and Type 10 enclosures set standards with which an explosion-proof enclosure within certain hazardous locations must comply. For example, a NEMA Type 7 standard applies to enclosures constructed for indoor use in certain hazardous locations. Hazardous locations may be defined by one or more of a number of authorities, including but not limited to the National Electric Code (e.g., Class 1, Division I) and UL (e.g., UL 1203). For example, a Class 1 hazardous area under the National Electric Code is an area in which flammable gases or vapors may be present in the air in sufficient quantities to be explosive.

As a specific example, NEMA standards for an explosion-proof enclosure of a certain size or range of sizes (e.g., greater than 100 $in^3$) may require that in a Group B, Division 1 area, any flame path of an explosion-proof enclosure must be at least 1 inch long (continuous and without interruption), and the gap between the surfaces cannot exceed 0.0015 inches. Standards created and maintained by NEMA may be found at www.nema.org/stds and are hereby incorporated by reference.

The example light fixtures having sensor modules (or components thereof) described herein can be made of one or more of a number of suitable materials to allow the light fixture and/or other associated components of a system to meet certain standards and/or regulations while also maintaining durability in light of the one or more conditions under which the light fixtures and/or other associated components of the system can be exposed. Examples of such materials can include, but are not limited to, aluminum, stainless steel, fiberglass, glass, plastic, ceramic, and rubber. Example embodiments can also be used in non-hazardous environments.

Example light fixtures (or portions thereof) having sensor modules described herein can be made from a single piece (as from a mold, injection mold, die cast, or extrusion process). In addition, or in the alternative, example light fixtures (or portions thereof) having sensor modules can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

Components and/or features described herein can include elements that are described as coupling, fastening, securing, or other similar terms. Such terms are merely meant to distinguish various elements and/or features within a component or device and are not meant to limit the capability or function of that particular element and/or feature. For example, a feature described as a "coupling feature" can couple, secure, fasten, abut against, and/or perform other functions aside from merely coupling.

A coupling feature (including a complementary coupling feature) as described herein can allow one or more components and/or portions of an example light fixture (e.g., a sensor device) to become mechanically coupled, directly or indirectly, to another portion of the light fixture (e.g., a housing). A coupling feature can include, but is not limited to, a portion of a hinge, an aperture, a recessed area, a protrusion, a slot, a spring clip, a male connector end, a female connector end, a tab, a detent, and mating threads. One portion of an example light fixture can be coupled to another portion of the light fixture by the direct use of one or more coupling features.

In addition, or in the alternative, a portion (e.g., a sensor device) of an example light fixture can be coupled to another portion (e.g., a housing) of the light fixture using one or more independent devices that interact with one or more coupling features disposed on a component of the light fixture. Examples of such devices can include, but are not limited to, a pin, a male connector end, a female connector end, a hinge, epoxy, welding, a fastening device (e.g., a bolt, a screw, a rivet), and a spring. One coupling feature described herein can be the same as, or different than, one or more other coupling features described herein. A complementary coupling feature as described herein can be a coupling feature that mechanically couples, directly or indirectly, with another coupling feature.

The mechanical coupling features are the primary focus of the various example embodiments described herein. Unless described otherwise below, the electrical connection between an example sensor module and a light fixture can be fairly standard, including one or more electrical conductors, one or more electrical connectors, one or more wire nuts, one or more terminal blocks, some other form of electrical connection, or any combination thereof. As described below, special circumstances can arise when the light fixture is located in a specialized environment (e.g., a hazardous environment). For example, potting or other form of encapsulation can be used for an electrical connection or for components used in an electrical connection between an example sensor module and a light fixture.

In the foregoing figures showing example embodiments of hazardous location light fixtures with sensor modules, one or more of the components shown may be omitted, repeated, and/or substituted. Accordingly, example embodiments of hazardous location light fixtures with sensor modules should not be considered limited to the specific arrangements of components shown in any of the figures. For example, features shown in one or more figures or described with respect to one embodiment can be applied to another embodiment associated with a different figure or description.

While example embodiments described herein are directed to light fixtures, integrating sensor modules can also be applied to the housing of any device (e.g., an electrical enclosure) in a hazardous environment. As defined herein, an electrical enclosure is any type of cabinet or housing inside of which is disposed electrical, mechanical, electromechanical, and/or electronic equipment. Such equipment can include, but is not limited to, a controller (also called a control module), a hardware processor, a power supply (e.g., a battery, a driver, a ballast), a sensor module, a safety barrier, a sensor, sensor circuitry, a light source, electrical cables, and electrical conductors. Examples of an electrical enclosure can include, but are not limited to, a housing for a light fixture, a housing for a sensor device, an electrical connector, a junction box, a motor control center, a breaker box, an electrical housing, a conduit, a control panel, an indicating panel, and a control cabinet.

In certain example embodiments, light fixtures (or other enclosures) having sensor modules are subject to meeting certain standards and/or requirements. For example, the National Electric Code (NEC), Underwriters Laboratories (UL), the National Electrical Manufacturers Association (NEMA), the International Electrotechnical Commission (IEC), the Federal Communication Commission (FCC), the Illuminating Engineering Society (IES), the Occupational Health and Safety Administration (OSHA), and the Institute of Electrical and Electronics Engineers (IEEE) set standards as to electrical enclosures, wiring, and electrical connections. Use of example embodiments described herein meet (and/or allow a corresponding device to meet) such standards when required. For example, UL844 sets forth standards for luminaires that are used in hazardous locations. In some (e.g., PV solar) applications, additional standards particular to that application may be met by the electrical enclosures described herein.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three digit number and corresponding components in other figures have the identical last two digits.

In addition, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of light fixtures with sensor modules will be described more fully hereinafter with reference to the accompanying drawings, in which example embodiments of light fixtures with sensor modules are shown. Light fixtures with sensor modules may, however, be embodied in many different forms and should not be construed as limited to the example embodiments set forth herein. Rather, these example embodiments are provided so that this disclosure will be thorough and complete, and will fully convey the scope of light fixtures with sensor modules to those of ordinary skill in the art. Like, but not necessarily the same, elements (also sometimes called components) in the various figures are denoted by like reference numerals for consistency.

Terms such as "first", "second", "top", "bottom", "side", "distal", "proximal", "up", "down", and "within" are used merely to distinguish one component (or part of a component or state of a component) from another. Such terms are not meant to denote a preference or a particular orientation, and are not meant to limit embodiments of light fixtures with sensor modules. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a system diagram of a lighting system 100 that includes a controller 104 of a light fixture 102 in accordance with certain example embodiments. The lighting system 100 can include one or more sensor modules 160, a power source 195, one or more users 150, a network manager 180, and at least one light fixture 102. In addition to the controller 104, the light fixture 102 can include at least one optional safety barrier 136, one or more optional antenna assembly 139, one or more optional energy storage devices 179, at least one power supply 140, and at least one light source 142. The controller 104 can include one or more of a number of components. As shown in FIG. 1, such components can include, but are not limited to, a control engine 106, a communication module 108, a real-time clock 110, an energy metering module 111, a power module 112, a storage repository 130, a hardware processor 120, a memory 122, a transceiver 124, an application interface 126, and, optionally, a security module 128. The components shown in FIG. 1 are not exhaustive, and in some embodiments, one or more of the components shown in FIG. 1 may not be included in an example light fixture. Any component of the example light fixture 102 can be discrete or combined with one or more other components of the light fixture 102.

A user 150 can be any person that interacts with light fixtures. Examples of a user may include, but are not limited to, an engineer, an electrician, an instrumentation and controls technician, a mechanic, an operator, a consultant, an inventory management system, an inventory manager, a foreman, a labor scheduling system, a contractor, and a manufacturer's representative. The user 150 can use a user system (not shown), which may include a display (e.g., a GUI). The user 150 interacts with (e.g., sends data to, receives data from) the controller 104 of the light fixture 102 via the application interface 126 (described below). The user 150 can also interact with a network manager 180 and/or one or more of the sensor modules 160. Interaction between the user 150 and the light fixture 102, the network manager 180, the power source 195, and the sensor modules 160 is conducted using communication links 105. Each communication link 105 can include wired (e.g., Class 1 electrical cables, Class 2 electrical cables, electrical connectors, power line carrier, DALI, RS485) and/or wireless (e.g., Wi-Fi, visible light communication, cellular networking, Bluetooth, WirelessHART, ISA100) technology. For example, a communication link 105 can be (or include) one or more electrical conductors that are coupled to the housing 103 (a type of enclosure) of the light fixture 102 and to a sensor module 160. The communication link 105 can transmit signals (e.g., power signals, communication signals, control signals, data) between the light fixture 102 and the user 150, the network manager 180, the power source 195, and/or one or more of the sensor modules 160.

The network manager 180 is a device or component that controls all or a portion of a communication network that includes the controller 104 of the light fixture 102, additional light fixtures, and the sensor modules 160 that are communicably coupled to the controller 104. The network manager 180 can be substantially similar to the controller 104. Alternatively, the network manager 180 can include one or more of a number of features in addition to, or altered from, the features of the controller 104 described below. As described herein, communication with the network manager 180 can include communicating with one or more other components (e.g., another light fixture) of the system 100. In such a case, the network manager 180 can facilitate such communication.

The power source 195 of the system 100 provides AC mains or some other form of power to the light fixture 102, as well as to one or more other components (e.g., the network manager 180) of the system 100. The power source 195 can include one or more of a number of components. Examples of such components can include, but are not limited to, an electrical conductor, a coupling feature (e.g., an electrical connector), a transformer, an inductor, a resistor, a capacitor, a diode, a transistor, and a fuse. The power source 195 can be, or include, for example, a wall outlet, an energy storage device (e.g. a battery, a supercapacitor), a circuit breaker, and/or an independent source of generation (e.g., a photovoltaic solar generation system). The power source 195 can also include one or more components (e.g., a switch, a relay, a controller) that allow the power source 195 to communicate with and/or follow instructions from the user 150, the controller 104, and/or the network manager 180.

An optional energy storage device 179 can be any of a number of rechargeable batteries or similar storage devices that are configured to charge using some source of power (e.g., the primary power provided to the light fixture, ultraviolet rays). The energy storage device 179 can use one or more of any type of storage technology, including but not limited to a battery, a flywheel, an ultracapacitor, and a supercapacitor. If the energy storage device 179 includes a battery, the battery technology can vary, including but not limited to lithium ion, nickel-cadmium, lead/acid, solid state, graphite anode, titanium dioxide, nickel cadmium, nickel metal hydride, nickel iron, alkaline, and lithium polymer. In some cases, one or more of the energy storage devices 179 charge using a different level and/or type of power relative to the level and type of power of the primary power. In such a case, the power supply 179 can convert, invert, transform, and/or otherwise manipulate the primary power to the level and type of power used to charge the energy storage devices 179. There can be any number of energy storage devices 179.

The optional antenna assembly 139 can be any device that is used to improve the ability of the light fixture 102 (or portion thereof, such as the transceiver 124) to send and/or receive signals with the network manager 180, the power source 195, the user 150, another light fixture, a remote sensor 160, and/or some other device within the lighting system 100. The antenna assembly 139 can be used to convert electrical power into radio waves and/or convert radio waves into electrical power. The antenna assembly 139 can be disposed at any location relative to the housing 103 of the light fixture 102, including but not limited to on the housing 103, remote from the housing 103, within the housing 103, or any suitable combination thereof.

In certain example embodiments, the antenna assembly 139 includes one or more of a number of components. Such components can include, but are not limited to, a balun, a block upconverter, a cable (e.g., a coaxial cable or other form of communication link 105), a counterpoise (a type of ground system), a feed, a receiver, a passive radiator, a feed line, a rotator, a tuner, a transmitter, a low-noise block downconverter, and a twin lead. Portions of the antenna assembly 139 can be in direct communication with, or can be shared with, one or more components (e.g., the communications module 108) of the controller 104. For example, the transceiver 124 of the controller 104 can be in direct communication with the antenna assembly 139.

A sensor module 160 can be directly coupled to the housing 103 (a type of enclosure) of the light fixture 102, as shown in FIGS. 3-16H below. Alternatively, a sensor module 160 can be coupled to another enclosure (e.g., the housing of another light fixture, a junction box) within the system 100, as shown in FIG. 17 below, The one or more sensor modules 160 can include any type of sensing device that measure one or more parameters. Examples of types of sensors of a sensor module 160 can include, but are not limited to, a passive infrared sensor, a photocell, a pressure sensor, an air flow monitor, a gas detector, and a resistance temperature detector. A parameter that can be measured by a sensor module 160 can include, but is not limited to, motion, an amount of ambient light, temperature within the housing 103 of the light fixture 102, humidity within the housing 103 of the light fixture 102, air quality within the housing 103 of the light fixture 102, vibration, occupancy of a space, pressure, air flow, smoke (as from a fire), temperature (e.g., excessive heat, excessive cold, an ambient temperature) outside the housing 103 of the light fixture 102.

Example sensor modules 160 described herein can include one or more of a number of components. For example, a sensor module 160 can have a housing that forms a cavity, inside of which can be disposed one or more components that can include, but are not limited to, a sensor, a circuit board, a mount. Coupled to the housing of a sensor module 160 can be a bezel, a lens, and/or any of a number of other components. The housing of a sensor module 160 can also include an extension with one or more of a number of coupling features. Various embodiments of the example sensor module 160 are provided in the figures below.

In some cases, the parameter or parameters measured by a sensor module 160 can be used to operate one or more light sources 142 of the light fixture 102. Each sensor module 160 can use one or more of a number of communication protocols. A sensor module 160 can be associated with the light fixture 102 or another light fixture in the system 100. Example sensor modules 160 are disposed in the ambient environment and are coupled to the housing 103 of the light fixture 102. In some cases, a sensor module 160 can additionally be located within the housing 103 of the light fixture 102.

In certain example embodiments, a sensor module 160 can include an energy storage device (e.g., a battery) that is used to provide power, at least in part, to some or all of the sensor module 160. In such a case, the energy storage device can be the same as, or independent of, the energy storage device 179, described above, of the light fixture 102. The energy storage device of the sensor module 160 can operate at all time or when a primary source of power to the light fixture 102 is interrupted. Further, a sensor module 160 can utilize or include one or more components (e.g., memory 122, storage repository 130, transceiver 124) found in the controller 104. In such a case, the controller 104 can provide the functionality of these components used by the sensor module 160. Alternatively, the sensor module 160 can include, either on its own or in shared responsibility with the controller 104, one or more of the components of the controller 104. In such a case, the sensor module 160 can correspond to a computer system as described below with regard to FIG. 2.

When the system 100 (or at least a sensor module 160) is located in a hazardous environment, the sensor module 160 can be intrinsically safe. As used herein, the term "intrinsically safe" refers to a device (e.g., a sensor described herein) that is placed in a hazardous environment. To be intrinsically safe, the device uses a limited amount of electrical energy so that sparks cannot occur from a short circuit or failures that can cause an explosive atmosphere found in hazardous environments to ignite. A safety barrier 136 is commonly used with an intrinsically safe device, where the safety barrier 136 limits the amount of power delivered to the sensor or other device to reduce the risk of explosion, fire, or other adverse condition that can be caused by high amounts of power in the hazardous environment. An adverse condition can also be an abnormal condition that is not potentially catastrophic in nature.

The optional safety barrier 136 can provide protection (e.g., overvoltage protection, overcurrent protection) for one or more components of the light fixture 102 when the light fixture 102 is located in a hazardous environment. For example, the safety barrier 136 can limit the amount of power delivered to the power module 112 of the controller 104 to reduce the risk of explosion, fire, or other adverse condition that can be caused by high amounts of power in the hazardous environment. The safety barrier 136 can be a required component when the light fixture 102 is located in a hazardous environment. For example, IEC 60079-11 requires that power must be less than 1.3 W during a fault condition. The safety barrier 136 can include one or more of a number of single or multiple discrete components (e.g., capacitor, inductor, transistor, diode, resistor, fuse), and/or a microprocessor. For example, a safety barrier 136 can be a capacitive barrier.

The user 150, the network manager 180, the power source 195, and/or the sensor modules 160 can interact with the controller 104 of the light fixture 102 using the application interface 126 in accordance with one or more example embodiments. Specifically, the application interface 126 of the controller 104 receives data (e.g., information, communications, instructions, updates to firmware) from and sends data (e.g., information, communications, instructions) to the user 150, the network manager 180, the power source 195, and/or each sensor module 160. The user 150, the network manager 180, the power source 195, and/or each sensor module 160 can include an interface to receive data from and send data to the controller 104 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

The controller 104, the user 150, the network manager 180, the power source 195, and/or the sensor modules 160 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 104. Examples of such a system can include, but are not limited to, a desktop computer with a Local Area Network (LAN), a Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 2.

Further, as discussed above, such a system can have corresponding software (e.g., user software, sensor software, controller software, network manager software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within the system 100.

The light fixture 102 can include a housing 103. The housing 103 can include at least one wall that forms a cavity 101. In some cases, the housing can be designed to comply with any applicable standards so that the light fixture 102 can be located in a particular environment (e.g., a hazardous environment). For example, if the light fixture 102 is located in an explosive environment, the housing 103 can be explosion-proof. According to applicable industry standards, an explosion-proof enclosure is an enclosure that is configured to contain an explosion that originates inside, or can propagate through, the enclosure.

Continuing with this example, the explosion-proof enclosure, as a Division 1 enclosure, is configured to allow gases from inside the enclosure to escape across joints of the enclosure and cool as the gases exit the explosion-proof enclosure. The joints are also known as flame paths and exist where two surfaces meet and provide a path, from inside the explosion-proof enclosure to outside the explosion-proof enclosure, along which one or more gases may travel. A joint may be a mating of any two or more surfaces. Each surface may be any type of surface, including but not limited to a flat surface, a threaded surface, and a serrated surface. Alternatively, if the explosion-proof enclosure is a Division 2 enclosure, then it can be gasketed to prohibit/reduce the likelihood of ingress of hazardous gas to the enclosure, but would not have any "flame-paths" should the gas get in and become ignited.

The housing 103 of the light fixture 102 can be used to house one or more components of the light fixture 102, including one or more components of the controller 104. For example, as shown in FIG. 1, the controller 104 (which in this case includes the control engine 106, the communication module 108, the real-time clock 110, the energy metering module 111, the power module 112, the storage repository 130, the hardware processor 120, the memory 122, the transceiver 124, the application interface 126, and the optional security module 128), the power supply 140, and the light sources 142 are disposed in the cavity 101 formed by the housing 103. In alternative embodiments, any one or more of these or other components of the light fixture 102 can be disposed on the housing 103 and/or remotely from the housing 103.

The storage repository 130 can be a persistent storage device (or set of devices) that stores software and data used to assist the controller 104 in communicating with the user 150, the network manager 180, the power source 195, and one or more sensor modules 160 within the system 100. In one or more example embodiments, the storage repository 130 stores one or more communication protocols 132, algorithms 133, and stored data 134. The communication protocols 132 can be any of a number of protocols that are used to send and/or receive data between the controller 104 and the user 150, the network manager 180, the power source 195, and one or more sensor modules 160. One or more of the communication protocols 132 can be a time-synchronized protocol. Examples of such time-synchronized protocols can include, but are not limited to, a highway addressable remote transducer (HART) protocol, a wirelessHART protocol, and an International Society of Automation (ISA) 100 protocol. In this way, one or more of the communication protocols 132 can provide a layer of security to the data transferred within the system 100.

The algorithms 133 can be any procedures (e.g., a series of method steps), formulas, logic steps, mathematical models, forecasts, simulations, and/or other similar operational procedures that the control engine 106 of the controller 104 follows based on certain conditions at a point in time. An example of an algorithm 133 is measuring (using the energy metering module 111), storing (using the stored data 134 in the storage repository 130), and evaluating the current and voltage delivered to and delivered by the power supply 140 over time.

Algorithms 133 can be focused on certain components of the light fixture 102. For example, one or more algorithms 133 can facilitate communication between a sensor module 160 and the control engine 106 of the controller 104. As a specific example, one or more algorithms 133 can be used by the control engine 106 to instruct a sensor module 160 to measure a parameter, for the sensor module 160 to send the measurement to the control engine 106, for the control engine 106 to analyze the measurement, (stored as stored data 134) and for the control engine 106 to take an action (e.g., instruct, using a communication protocol 132, one or more other components of the light fixture 102 to operate) based on the result (stored as stored data 134) of the analysis.

As another example, one or more algorithms 133 can facilitate communication between an antenna 139 and the control engine 106 of the controller 104. As a specific example, one or more algorithms 133 can be used by the control engine 106 to receive (using a communication protocol 132) a signal received by the antenna 139, for the control engine 106 to analyze the signal, and for the control engine 106 to take an action (e.g., instruct one or more other components of the light fixture 102 to operate) based on the result of the analysis. As another specific example, one or more algorithms 133 can be used by the control engine 106 to determine that a communication to a device external to the light fixture 102 needs to be sent, and to send a communication signal (using a communication protocol 132 and saved as stored data 134) to the antenna 139.

One or more algorithms 133 can be used for more advanced functions. For example, some algorithms 133 can be focused on prognostic and health monitoring of the light fixture 102. As an example, there can be one or more algorithms 133 that focus on the integrity of the housing 103 of the light fixture 102. One such example of an algorithm 133 is predicting the life of a gasket (disposed, for example, between a cover and a body of the housing 103) of the light fixture 102 based on the temperature within the cavity 101 (as measured by a sensor module 160 and stored as stored data 134) and the characteristics of the gasket material (stored as stored data 134).

One or more algorithms 133 used in example embodiments can also be used to detect, in real time, instantaneous failures of one or more components of the light fixture 102. For example, if a power spike (e.g., a fault) at the power supply 140 is measured by the energy metering module 111, the control engine 106 can use one or more algorithms 133 to instantaneously, in real time, compare the excessively high voltage reading with a threshold value, determine that the voltage measurement represents a fault, and takes immediate action (e.g., opens a switch to stop receiving power from the source of the fault, uses a secondary source of power to maintain the operation of the light fixture 102) to minimize damage to the components of the light fixture 102 that can be caused by the fault and maintain a safe operating environment (e.g., allow the light sources 142 to continue to receive power to continue emitting light) in the area of the light fixture 102.

Other algorithms 133 can be directed to the light sources 142 of the light fixture 102. For example, lumen depreciation data collected under the LM-80 standard, developed by the IES, and published by LED package manufacturers can be stored as stored data 134 and compared with temperatures (as measured by one or more sensor modules 160 and stored as stored data 134) of light sources 142 of the light fixture 102 to see if a correlation can be developed. As another example, when one or more light sources 142 of the light fixture 102 are determined to begin failing, the algorithm 133 can direct the control engine 106 to generate an alarm for predictive maintenance.

As example, an algorithm 133 can continuously monitor the current (as measured by the energy metering module 111 and stored as stored data 134) output by the power supply 140 and the reference current. In addition to the dimmer setting, the algorithm can detect variations of the output current of the power supply 140 and the reference current for a given dimmer setting and predict failure of the power supply 140. In such a case, the direction of the variation can dictate whether there is a short circuit or an open circuit involved.

Another example algorithm 133 can measure and analyze the current output and current ripple of the power supply 140 over time. If the current ripple relative to the current output exceeds a threshold value, then the power supply 140 can be classified as failed. Yet another example algorithm 133 can monitor a temperature of a critical component (e.g., electrolytic capacitors, Controller IC, Blocking diode, TVS) of the power supply 140 over time. The estimated remaining life of the power supply 140 can be based on degradation curves of those components and threshold values established for those components.

Still another example algorithm 133 can measure and analyze the equivalent series resistance of the output electrolytic capacitors of the power supply 140 over time. An alarm can be generated by the control engine 106 when the resistance exceeds a threshold value, indicating failure of the power supply 140. Yet another example algorithm 133 can be to measure and analyze the magnitude and number of surges (ringing waves) that the power supply 140 is subjected to over time. The algorithm 133 can predict the expected useful life of the power supply 140 based on a threshold value. Still another example algorithm 133 can measure and analyze the efficiency of the power supply 140 over time. An alarm can be generated by the control engine 106 when the efficiency of the power supply 140 falls below a threshold value, indicating failure of the power supply 140.

An algorithm 133 can be based on stress models. For example, an algorithm 133 can develop a stress versus life relationship using accelerated life testing for the light fixture 102 or a component thereof. One instance would be an actual lifetime temperature of the power supply 140 versus a modeled or estimated temperature profile of the power supply 140. Another instance would be using LM-80 test data developed for the light sources 142.

As another example, an algorithm 133 can measure and analyze real-time application stress conditions of the light fixture 102 or components thereof over time and use developed models to estimate the life of the light fixture or components thereof. In such a case, mathematical models can be developed using one or more mathematical theories (e.g., Arrhenius theory, Palmgran-Miner Rules) to predict useful life of the light fixture 102 or components thereof under real stress conditions. As yet another example, an algorithm 133 can use predicted values and actual data to estimate the remaining life of the light fixture 102 or components thereof.

Stored data 134 can be any data associated with the light fixture 102 (including other light fixtures and/or any components thereof), any measurements taken by the sensor modules 160, measurements taken by the energy metering module 111, threshold values, results of previously run or calculated algorithms, and/or any other suitable data. Such data can be any type of data, including but not limited to historical data for the light fixture 102, historical data for other light fixtures, calculations, measurements taken by the energy metering module 111, and measurements taken by one or more sensor modules 160. The stored data 134 can be associated with some measurement of time derived, for example, from the real-time clock 110.

Examples of a storage repository 130 can include, but are not limited to, a database (or a number of databases), a file system, a hard drive, flash memory, some other form of solid state data storage, or any suitable combination thereof. The storage repository 130 can be located on multiple physical machines, each storing all or a portion of the communication protocols 132, the algorithms 133, and/or the stored data 134 according to some example embodiments. Each storage unit or device can be physically located in the same or in a different geographic location.

The storage repository 130 can be operatively connected to the control engine 106. In one or more example embodiments, the control engine 106 includes functionality to communicate with the user 150, the network manager 180, the power source 195, and the sensor modules 160 in the system 100. More specifically, the control engine 106 sends information to and/or receives information from the storage repository 130 in order to communicate with the user 150, the network manager 180, the power source 195, and the sensor modules 160. As discussed below, the storage repository 130 can also be operatively connected to the communication module 108 in certain example embodiments.

In certain example embodiments, the control engine 106 of the controller 104 controls the operation of one or more components (e.g., the communication module 108, the real-time clock 110, the transceiver 124) of the controller 104. For example, the control engine 106 can activate the communication module 108 when the communication module 108 is in "sleep" mode and when the communication module 108 is needed to send data received from another component (e.g., a sensor module 160, the user 150) in the system 100.

As another example, the control engine 106 can acquire the current time using the real-time clock 110. The real time clock 110 can enable the controller 104 to control the light fixture 102 even when the controller 104 has no communication with the network manager 180. As yet another example, the control engine 106 can direct the energy metering module 111 to measure and send power consumption information of the light fixture 102 to the network manager 180. In some cases, the control engine 106 of the controller 104 can generate and send a dimming signal (e.g., 0-10 V DC) to the power supply 140, which causes the power supply 140 to adjust the light output of the light sources 142.

The control engine 106 of the controller 104 can communicate with one or more of the sensor modules 160 and make determinations based on measurements made by the sensor modules 160. For example, the control engine 106 can use one or more algorithms 133 to facilitate communication with a sensor module 160. As a specific example, the control engine 160 can use one or more algorithms 133 to instruct a sensor module 160 to measure a parameter, for the sensor module 160 to send the measurement to the control engine 106, for the control engine 106 to analyze the measurement, (stored as stored data 134) and for the control engine 106 to take an action (e.g., instruct, using a communication protocol 132, one or more other components of the light fixture 102 to operate) based on the result (stored as stored data 134) of the analysis.

The control engine 106 can also use the antenna assembly 139 to send and/or receive communications. As a specific example, the control engine 106 can use one or more algorithms 133 to receive (using a communication protocol 132) a signal received by the antenna assembly 139, for the control engine 106 to analyze the signal, and for the control engine 106 to take an action (e.g., instruct one or more other components of the light fixture 102 to operate) based on the result of the analysis. As another specific example, the control engine 106 can use one or more algorithms 133 to determine that a communication to a device external to the light fixture 102 needs to be sent, and to send a communication signal (using a communication protocol 132 and saved as stored data 134) to the antenna assembly 139.

The control engine 106 can also use a sensor module 160 to perform more advanced functions. For example, the control engine 106 can be configured to perform a number of functions that help prognosticate and monitor the health of the light fixture 102 (or components thereof), either continually or on a periodic basis, using a sensor module 160. In other words, the control engine 106 analyzes one or more factors that can affect the longevity of one or more components of the light fixture 102 using a sensor module 160. For example, the control engine 106 can execute any of the algorithms 133 stored in the storage repository 130. As a specific example, the control engine 106 can measure (using the energy metering module 111), store (as stored data 134 in the storage repository 130), and evaluate, using an algorithm 133, the current and voltage delivered to and delivered by the power supply 140 over time.

As another specific example, the control engine 106 can use one or more algorithms 133 that focus on certain components of the light fixture 102. For example, the control engine 106 can use one or more algorithms 133 that focus on the integrity of the housing 103 of the light fixture 102. As stated above, one such example of an algorithm 133 is predicting the life of a gasket (disposed, for example, between a cover and a body of the housing 103) of the light fixture 102 based on the temperature within the cavity 101 (as measured by a sensor module 160 and stored as stored data 134) and the characteristics of the gasket material (stored as stored data 134). In such a case, the control engine 106 can control the sensor modules 160 that perform the measurements.

The control engine 106 can also detect, in real time, instantaneous failures of one or more components of the light fixture 102. For example, if a power spike (e.g., a fault) at the power supply 140 is measured by the energy metering module 111, the control engine 106 can instantaneously, in real time, compare the excessively high voltage reading with a threshold value, determine that the voltage measurement represents a fault, and takes immediate action (e.g., opens a switch to stop receiving power from the source of the fault, uses a secondary source of power to maintain the operation of the light fixture 102) to minimize damage to the components of the light fixture 102 that can be caused by the fault and maintain a safe operating environment (e.g., allow the light sources 142 to continue to receive power to continue emitting light) in the area of the light fixture 102.

The control engine 106 can also collect data, under the LM-80 standard, of one or more light sources 142, store the data as stored data 134, and compare this data with temperatures (as measured by one or more sensor modules 160 and stored as stored data 134) of light sources 142 of the light fixture 102 to see if a correlation can be developed. For instance, data generated by a component manufacturer (e.g., information about the light source 142 listed on the packaging for the light fixture 102) using a reliability testing protocols (e.g., IES LM-80) can be used to generate stress versus life correlation models. Subsequently, those models can be stored in the storage repository 130 as algorithms 133 by the control engine 106. The real-time stress information collected in the application environment using multiple sensor modules 160 can be used by the control engine 106, along with stress-life models stored in storage repository 130, to predict the useful life of the light fixture 102 and/or components thereof. As another example, the control engine 106 can determine whether one or more light sources 142 of the light fixture 102 are failing and generate an alarm for predictive maintenance.

As another example, the control engine 106 can be configured to continuously monitor the current (as measured by the energy metering module 111 and stored as stored data 134) output by the power supply 140 and the reference current. The control engine 106 can also determine the dimmer setting, and so detect variations of the output current of the power supply 140 and the reference current for a given dimmer setting and predict failure of the power supply 140. In such a case, the direction of the variation can dictate whether there is a short circuit or an open circuit involved. The control engine 106 can also monitor the sensor module 160 to ensure that it is working properly and send a notification (e.g., to a user 150, to the network manager 180) when the control engine 106 determines that the sensor module 160 is failing or has failed.

As yet another example, the control engine 106 can measure (using one or more sensor modules 160) and analyze the current output and current ripple of the power supply 140 over time. If the current ripple (e.g., peak-to-peak ripple current, RMS current) relative to the current output exceeds a threshold value, then the control engine 106 can classify the power supply 140 as failed. As still another example, the PHM engine 106 can monitor a temperature (using one or more sensor modules 160) of a critical component (e.g., electrolytic capacitors, Controller IC, Blocking diode, TVS) of the power supply 140 over time. The control engine 106 can estimate the remaining life of the power supply 140 based on degradation curves of those components and threshold values established for those components.

The control engine 106 can provide control, communication, and/or other similar signals to the user 150, the network manager 180, the power source 195, and one or more of the sensor modules 160. Similarly, the control engine 106 can receive control, communication, and/or other similar signals from the user 150, the network manager 180, the power source 195, and one or more of the sensor modules 160. The control engine 106 can control each sensor module 160 automatically (for example, based on one or more algorithms stored in the control engine 106) and/or based on control, communication, and/or other similar signals received from another device through a communication link 105. The control engine 106 may include a printed circuit board, upon which the hardware processor 120 and/or one or more discrete components of the controller 104 are positioned.

In certain embodiments, the control engine 106 of the controller 104 can communicate with one or more components of a system external to the system 100. For example, the control engine 106 can interact with an inventory management system by ordering a light fixture (or one or more components thereof) to replace the light fixture 102 (or one or more components thereof) that the control engine 106 has determined to fail or be failing. As another example, the control engine 106 can interact with a workforce scheduling system by scheduling a maintenance crew to repair or replace the light fixture 102 (or portion thereof) when the control engine 106 determines that the light fixture 102 or portion thereof requires maintenance or replacement. In this way, the controller 104 is capable of performing a number of functions beyond what could reasonably be considered a routine task.

In certain example embodiments, the control engine 106 can include an interface that enables the control engine 106 to communicate with one or more components (e.g., power supply 140) of the light fixture 102. For example, if the power supply 140 of the light fixture 102 operates under IEC Standard 62386, then the power supply 140 can have a serial communication interface that will transfer data (e.g., stored data 134) measured by the sensor modules 160. In such a case, the control engine 106 can also include a serial interface to enable communication with the power supply 140 within the light fixture 102. Such an interface can operate in conjunction with, or independently of, the communication protocols 132 used to communicate between the controller 104 and the user 150, the network manager 180, the power source 195, and the sensor modules 160.

The control engine 106 (or other components of the controller 104) can also include one or more hardware components and/or software elements to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit ($I^2C$), and a pulse width modulator (PWM).

The communication module 108 of the controller 104 determines and implements the communication protocol (e.g., from the communication protocols 132 of the storage repository 130) that is used when the control engine 106 communicates with (e.g., sends signals to, receives signals from) the user 150, the network manager 180, the power source 195, and/or one or more of the sensor modules 160. In some cases, the communication module 108 accesses the stored data 134 to determine which communication protocol is used to communicate with the sensor module 160 associated with the stored data 134. In addition, the communication module 108 can interpret the communication protocol of a communication received by the controller 104 so that the control engine 106 can interpret the communication.

The communication module 108 can send and receive data between the network manager 180, the power source 195, the sensor modules 160, and/or the users 150 and the controller 104. The communication module 108 can send and/or receive data in a given format that follows a particular communication protocol 132. The control engine 106 can interpret the data packet received from the communication module 108 using the communication protocol 132 information stored in the storage repository 130. The control engine 106 can also facilitate the data transfer between one or more sensor modules 160 and the network manager 180 or a user 150 by converting the data into a format understood by the communication module 108.

The communication module 108 can send data (e.g., communication protocols 132, algorithms 133, stored data 134, operational information, alarms) directly to and/or retrieve data directly from the storage repository 130. Alternatively, the control engine 106 can facilitate the transfer of data between the communication module 108 and the storage repository 130. The communication module 108 can also provide encryption to data that is sent by the controller 104 and decryption to data that is received by the controller 104. The communication module 108 can also provide one or more of a number of other services with respect to data sent from and received by the controller 104. Such services can include, but are not limited to, data packet routing information and procedures to follow in the event of data interruption.

The real-time clock 110 of the controller 104 can track clock time, intervals of time, an amount of time, and/or any other measure of time. The real-time clock 110 can also count the number of occurrences of an event, whether with or without respect to time. Alternatively, the control engine 106 can perform the counting function. The real-time clock 110 is able to track multiple time measurements concurrently. The real-time clock 110 can track time periods based on an instruction received from the control engine 106, based on an instruction received from the user 150, based on an instruction programmed in the software for the controller 104, based on some other condition or from some other component, or from any combination thereof.

The real-time clock 110 can be configured to track time when there is no power delivered to the controller 104 (e.g., the power module 112 malfunctions) using, for example, a super capacitor or a battery backup. In such a case, when there is a resumption of power delivery to the controller 104, the real-time clock 110 can communicate any aspect of time to the controller 104. In such a case, the real-time clock 110 can include one or more of a number of components (e.g., a super capacitor, an integrated circuit) to perform these functions.

The energy metering module 111 of the controller 104 measures one or more components of power (e.g., current, voltage, resistance, VARs, watts) at one or more points within the light fixture 102. The energy metering module 111 can include any of a number of measuring devices and related devices, including but not limited to a voltmeter, an ammeter, a power meter, an ohmmeter, a current transformer, a potential transformer, and electrical wiring. The energy metering module 111 can measure a component of power continuously, periodically, based on the occurrence of an event, based on a command received from the control module 106, and/or based on some other factor. For purposes herein, the energy metering module 111 can be considered a type of sensor (e.g., sensor module 160). In this way, a component of power measured by the energy metering module 111 can be considered a parameter herein.

The power module 112 of the controller 104 provides power to one or more other components (e.g., real-time clock 110, control engine 106) of the controller 104. In addition, in certain example embodiments, the power module 112 can provide power to the power supply 140 of the light fixture 102. The power module 112 can include one or more of a number of single or multiple discrete components (e.g., transistor, diode, resistor), and/or a microprocessor. The power module 112 may include a printed circuit board, upon which the microprocessor and/or one or more discrete components are positioned. In some cases, the power module 112 can include one or more components that allow the power module 112 to measure one or more elements of power (e.g., voltage, current) that is delivered to and/or sent from the power module 112, Alternatively, the controller 104 can include a power metering module (not shown) to measure one or more elements of power that flows into, out of, and/or within the controller 104. Such a power metering module can also be considered a type of sensor (e.g., sensor module 160) herein.

The power module 112 can include one or more components (e.g., a transformer, a diode bridge, an inverter, a converter) that receives power (for example, through an electrical cable) from a source external to the light fixture 102 and generates power of a type (e.g., alternating current, direct current) and level (e.g., 12V, 24V, 120V) that can be used by the other components of the controller 104 and/or by the power supply 140. The power module 112 can use a closed control loop to maintain a preconfigured voltage or current with a tight tolerance at the output. The power module 112 can also protect the rest of the electronics (e.g., hardware processor 120, transceiver 124) in the light fixture 102 from surges generated in the line.

In addition, or in the alternative, the power module 112 can be a source of power in itself to provide signals to the other components of the controller 104 and/or the power supply 140. For example, the power module 112 can be a battery. As another example, the power module 112 can be a localized photovoltaic power system. The power module 112 can also have sufficient isolation in the associated components of the power module 112 (e.g., transformers, opto-couplers, current and voltage limiting devices) so that the power module 112 is certified to provide power to an intrinsically safe circuit.

In certain example embodiments, the power module 112 of the controller 104 can also provide power and/or control signals, directly or indirectly, to one or more of the sensor modules 160. In such a case, the control engine 106 can direct the power generated by the power module 112 to the sensor modules 160 and/or the power supply 140 of the light fixture 102. In this way, power can be conserved by sending power to the sensor modules 160 and/or the power supply 140 of the light fixture 102 when those devices need power, as determined by the control engine 106.

The hardware processor 120 of the controller 104 executes software, algorithms, and firmware in accordance with one or more example embodiments. Specifically, the hardware processor 120 can execute software on the control engine 106 or any other portion of the controller 104, as well as software used by the user 150, the network manager 180, the power source 195, and/or one or more of the sensor modules 160. The hardware processor 120 can be an integrated circuit, a central processing unit, a multi-core processing chip, SoC, a multi-chip module including multiple multi-core processing chips, or other hardware processor in one or more example embodiments. The hardware processor 120 is known by other names, including but not limited to a computer processor, a microprocessor, and a multi-core processor.

In one or more example embodiments, the hardware processor 120 executes software instructions stored in memory 122. The memory 122 includes one or more cache memories, main memory, and/or any other suitable type of memory. The memory 122 can include volatile and/or non-volatile memory. The memory 122 is discretely located within the controller 104 relative to the hardware processor 120 according to some example embodiments. In certain configurations, the memory 122 can be integrated with the hardware processor 120.

In certain example embodiments, the controller 104 does not include a hardware processor 120. In such a case, the controller 104 can include, as an example, one or more field programmable gate arrays (FPGA), one or more insulated-gate bipolar transistors (IGBTs), one or more integrated circuits (ICs). Using FPGAs, IGBTs, ICs, and/or other similar devices known in the art allows the controller 104 (or portions thereof) to be programmable and function according to certain logic rules and thresholds without the use of a hardware processor. Alternatively, FPGAs, IGBTs, ICs, and/or similar devices can be used in conjunction with one or more hardware processors 120.

The transceiver 124 of the controller 104 can send and/or receive control and/or communication signals. Specifically, the transceiver 124 can be used to transfer data between the controller 104 and the user 150, the network manager 180, the power source 195, and/or the sensor modules 160. The transceiver 124 can use wired and/or wireless technology. The transceiver 124 can be configured in such a way that the control and/or communication signals sent and/or received by the transceiver 124 can be received and/or sent by another transceiver that is part of the user 150, the network manager 180, the power source 195, and/or the sensor modules 160. The transceiver 124 can use any of a number of signal types, including but not limited to radio signals.

When the transceiver 124 uses wireless technology, any type of wireless technology can be used by the transceiver 124 in sending and receiving signals. Such wireless technology can include, but is not limited to, Wi-Fi, visible light communication, cellular networking, and Bluetooth. The transceiver 124 can use one or more of any number of suitable communication protocols (e.g., ISA100, HART) when sending and/or receiving signals. Such communication protocols can be stored in the communication protocols 132 of the storage repository 130. Further, any transceiver information for the user 150, the network manager 180, the power source 195, and/or the sensor modules 160 can be part of the stored data 134 (or similar areas) of the storage repository 130.

Optionally, in one or more example embodiments, the security module 128 secures interactions between the controller 104, the user 150, the network manager 180, the power source 195, and/or the sensor modules 160. More specifically, the security module 128 authenticates communication from software based on security keys verifying the identity of the source of the communication. For example, user software may be associated with a security key enabling the software of the user 150 to interact with the controller 104 and/or the sensor modules 160. Further, the security module 128 can restrict receipt of information, requests for information, and/or access to information in some example embodiments.

As mentioned above, aside from the controller 104 and its components, the light fixture 102 can include a power supply 140 and one or more light sources 142. The light sources 142 of the light fixture 102 are devices and/or components typically found in a light fixture to allow the light fixture 102 to operate. The light fixture 102 can have one or more of any number and/or type of light sources 142. Examples of such light sources 142 can include, but are not limited to, a local control module, a light source, a light engine, a heat sink, an electrical conductor or electrical cable, a terminal block, a lens, a diffuser, a reflector, an air moving device, a baffle, a dimmer, and a circuit board. A light source 142 can use any type of lighting technology, including but not limited to LED, incandescent, sodium vapor, and fluorescent.

The power supply 140 of the light fixture 102 provides power to one or more of the light sources 142. The power supply 140 can be called by any of a number of other names, including but not limited to a driver, a LED driver, and a ballast. The power supply 140 can be substantially the same as, or different than, the power module 112 of the controller 104. The power supply 140 can include one or more of a number of single or multiple discrete components (e.g., transistor, diode, resistor), and/or a microprocessor. The power supply 140 may include a printed circuit board, upon which the microprocessor and/or one or more discrete components are positioned, and/or a dimmer.

The power supply 140 can include one or more components (e.g., a transformer, a diode bridge, an inverter, a converter) that receives power (for example, through an electrical cable) from the power module 112 of the controller 104 and generates power of a type (e.g., alternating current, direct current) and level (e.g., 12V, 24V, 120V) that can be used by the light sources 142. In addition, or in the alternative, the power supply 140 can receive power from a source external to the light fixture 102. In addition, or in the alternative, the power supply 140 can be a source of power in itself. For example, the power supply 140 can be a battery, a localized photovoltaic power system, or some other source of independent power.

As stated above, the light fixture 102 can be placed in any of a number of environments. In such a case, the housing 103 of the light fixture 102 can be configured to comply with applicable standards for any of a number of environments. For example, the housing 103 of a light fixture 102 can be rated as a Division 1 or a Division 2 enclosure under NEC standards. Similarly, any of the sensor modules 160 or other devices communicably coupled to the light fixture 102 can be configured to comply with applicable standards for any of a number of environments. For example, a sensor module 160 can be rated as a Division 1 or a Division 2 enclosure under NEC standards.

The sensor module 160 can be configured to comply with one or more other applicable standards. For example, an example sensor module 160 can be designed to withstand a certain minimum physical impact when coupled to the housing 103 of the light fixture 102. In such a case, the sensor module 160 remains coupled to the housing 103 of the light fixture 102 after such an impact, and also continues to function properly after such an impact. As a specific example, a sensor module 160 coupled to the housing 103 of the light fixture 102 can comply with UL844 by being able to withstand an impact having at least 6.8 Joules of force.

Figure 2:
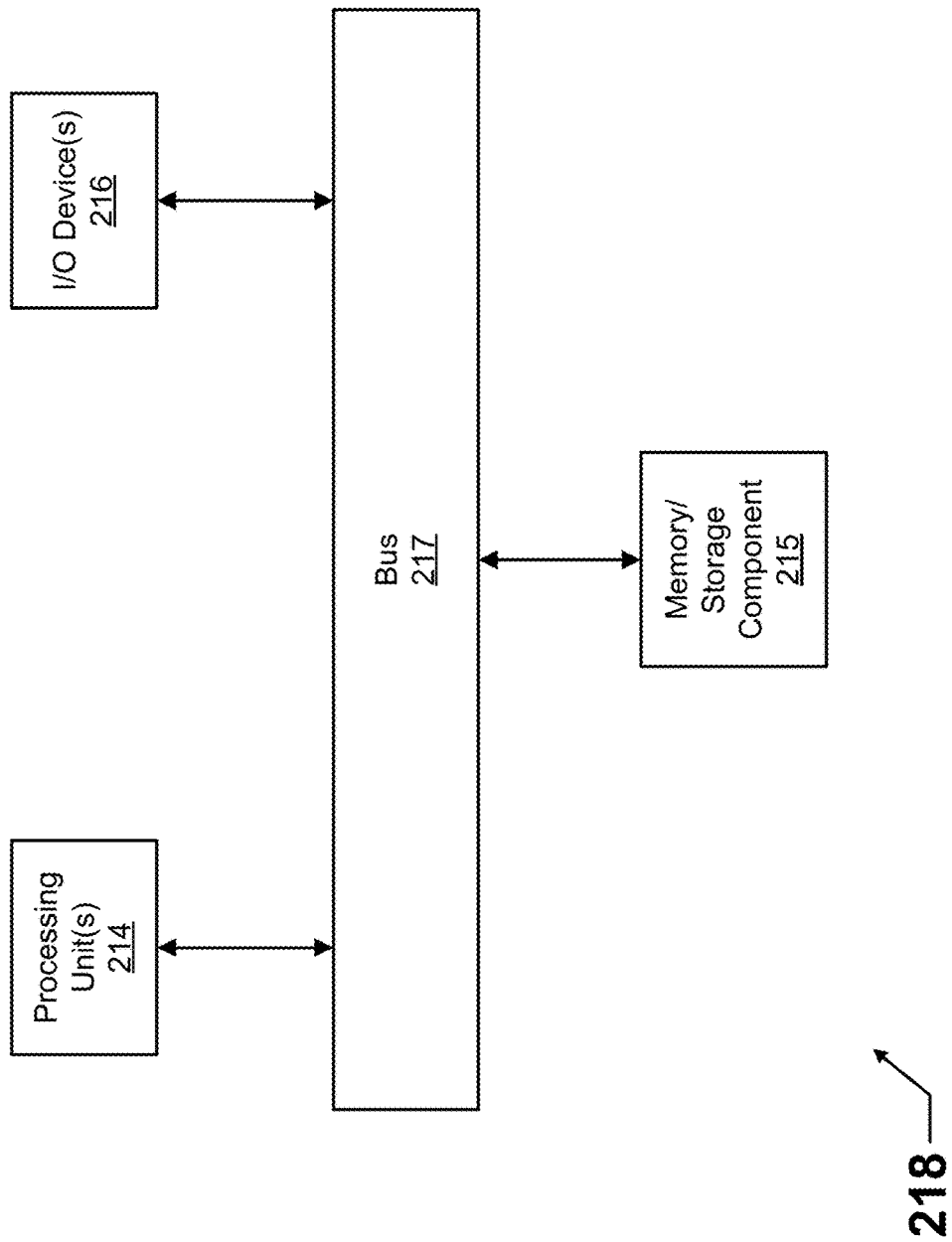
FIG. 2 shows a computing device in accordance with certain example embodiments.

FIG. 2 illustrates one embodiment of a computing device 218 that implements one or more of the various techniques described herein, and which is representative, in whole or in part, of the elements described herein pursuant to certain exemplary embodiments. Computing device 218 is one example of a computing device and is not intended to suggest any limitation as to scope of use or functionality of the computing device and/or its possible architectures. Neither should computing device 218 be interpreted as having any dependency or requirement relating to any one or combination of components illustrated in the example computing device 218.

Computing device 218 includes one or more processors or processing units 214, one or more memory/storage components 215, one or more input/output (I/O) devices 216, and a bus 217 that allows the various components and devices to communicate with one another. Bus 217 represents one or more of any of several types of bus structures, including a memory bus or memory controller, a peripheral bus, an accelerated graphics port, and a processor or local bus using any of a variety of bus architectures. Bus 217 includes wired and/or wireless buses.

Memory/storage component 215 represents one or more computer storage media. Memory/storage component 215 includes volatile media (such as random access memory (RAM)) and/or nonvolatile media (such as read only memory (ROM), flash memory, optical disks, magnetic disks, and so forth). Memory/storage component 215 includes fixed media (e.g., RAM, ROM, a fixed hard drive, etc.) as well as removable media (e.g., a Flash memory drive, a removable hard drive, an optical disk, and so forth).

One or more I/O devices 216 allow a customer, utility, or other user to enter commands and information to computing device 218, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 218 is connected to a network (not shown) (e.g., a local area network (LAN), a wide area network (WAN) such as the Internet, cloud, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer system 218 includes at least the minimal processing, input, and/or output means necessary to practice one or more embodiments.

Further, those skilled in the art will appreciate that one or more elements of the aforementioned computer device 218 is located at a remote location and connected to the other elements over a network in certain exemplary embodiments. Further, one or more embodiments is implemented on a distributed system having one or more nodes, where each portion of the implementation (e.g., control engine 106) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

Figure 3:
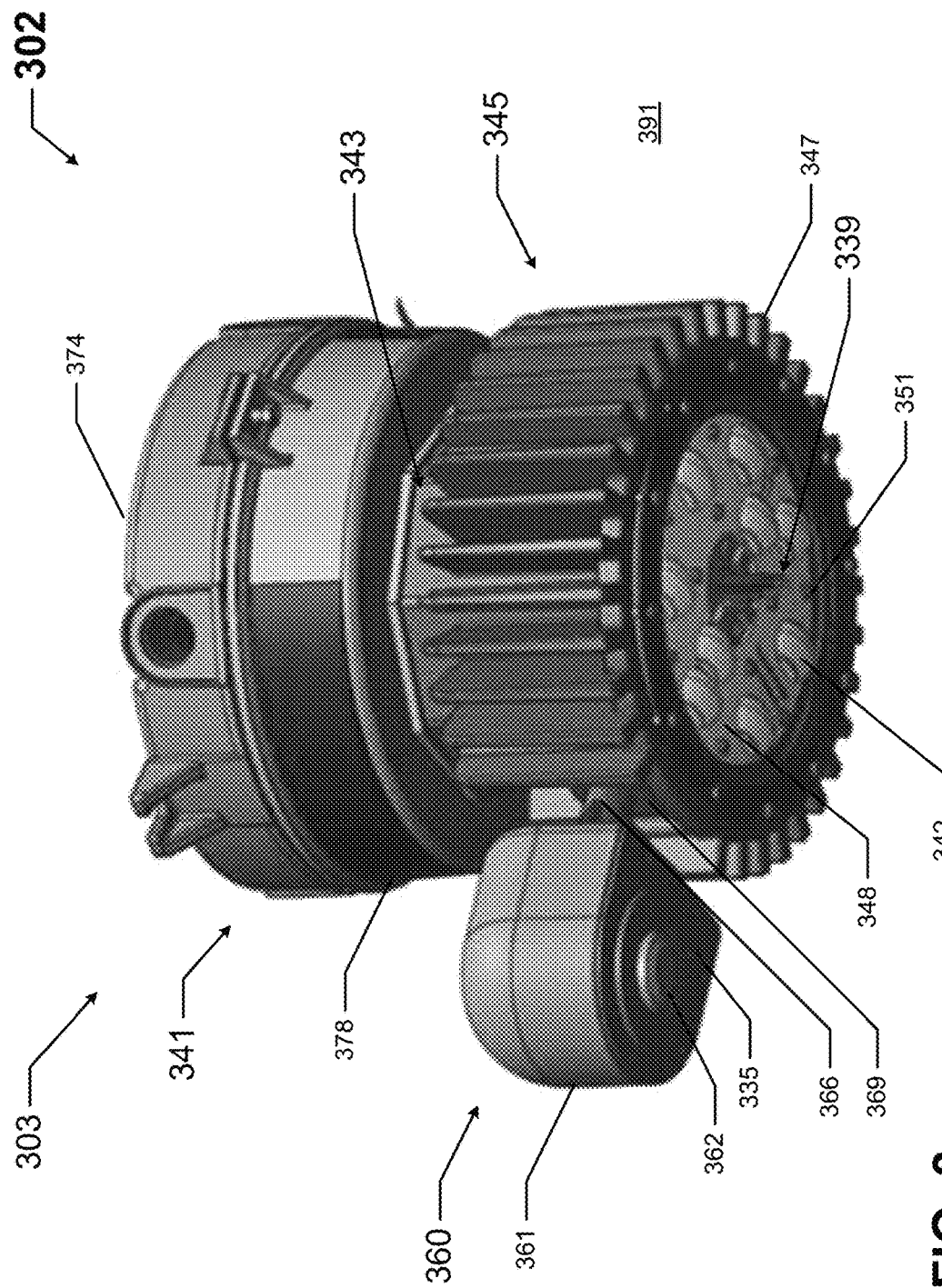
FIG. 3 shows a light fixture in accordance with certain example embodiments.

FIG. 3 shows a light fixture 302 in accordance with certain example embodiments. Referring to FIGS. 1-3, the light fixture 302 of FIG. 3 is the physical embodiment of the light fixture 102 of FIG. 1. The light fixture 302 is located in an ambient environment 391, which can be a hazardous environment. The light fixture 302 of FIG. 3 includes a housing 303, a number of light sources 342, and a sensor module 360 coupled to the housing 303. The housing 303 can have one or more sections. In this case, the housing 303 consists of section 341 and section 343. Section 341 is disposed atop section 343 and includes top hat 374, which can be hingedly coupled to the rest of section 341. Section 341 can form a cavity, inside of which one or more components (e.g., one or more power supplies 140, the controller 104) of the light fixture 302 can be disposed.

Similarly, one or more components (e.g., one or more light sources 342, antenna assembly 339) of the light fixture 302 can be disposed on or within, at least in part, section 343 of the housing 303. When a component is disposed on a section (e.g., section 343) of the housing 303, a protective device (e.g., a lens 351) can be used, at least in part, to cover and protect such components. When the housing 303 has multiple sections, there can be one or more communication links (e.g., communication link 105) disposed between them. Further, these multiple components can be designed to couple to each other in such a way that the entire housing 303 complies with applicable standards (e.g., hazardous location requirements).

One or more portions of the housing 303 can be made of a thermally conductive material (e.g., metal). In some cases, such as with the light fixture 302 of FIG. 3, a heat sink assembly 345 (also sometimes referred to more simply herein as a heat sink 345) can be disposed on and/or integrated with a portion of the housing 303 (or section thereof). In this particular example, the heat sink 345 is integrated with a portion of section 343 of the housing 303. A heat sink assembly 345 often has one or more features (in this case, heat sink fins 347) that increase the surface area of the heat sink assembly 345, thereby increasing its thermal transfer efficiency.

These features of the heat sink assembly 345 can be of any number and/or have any of a number of configurations. In this case, the heat sink fins 347 are vertically-oriented protrusions that extend outward from the section 343 of the housing 303 and are spaced substantially equidistantly around the outer perimeter of the section 343 of the housing 303. A small exception can exist when the sensor module 360 is coupled to an exterior surface of the housing 303, as in this case. Specifically, a mounting feature 369 of the section 343 of the housing 303 can couple to the sensor module 360. The mounting feature 369 can have any of a number of configurations. For example, in this case, sensor module 360 includes a tubular extension 366 that extends radially from the section 343 of the housing 303. In addition, or in the alternative, the tubular extension 366 can be part of the mounting feature 369. As another example, the mounting feature 369 can be an opening in a wall of the section 343 of the housing 303. In any case, the mounting feature 369 can include any of a number of coupling features that couple to complementary coupling features disposed on the sensor module 360. In this case, there are no heat sink fins 347 adjacent to the sensor module 360 to allow, as some examples, for clearance in the proper function of the sensor of the sensor module 360.

The sensor module 360 can have a housing 361 that contains one or more of a number of components (e.g., sensor, a lens 362, a bezel 335, electrical conductors (a form of communication link 105) of the sensor module 360. The light fixture 302, in conjunction with various components (e.g., the housing 361) of the sensor module 360, can be engineered and made of such materials as to meet any applicable standards that apply to the ambient environment 391 in which the light fixture 302 is located. For example, if the ambient environment 391 in which the light fixture 302 is located is a hazardous environment, then a safety barrier (e.g., safety barrier 136) can be disposed within the housing 303 of the light fixture 302 for any electrical conductors that run between the sensor module 360 and the housing 303 of the light fixture 302. Similarly, the components within the sensor module 360 that are coupled to those electrical conductors can be designed to run on lower voltages to avoid creating a spark or arcing.

By having the sensor module 360 coupled to the exterior of the housing 303 of the light fixture 302, the sensor module 360 can measure a wider array of parameters that can affect the operation of the light fixture 302. Further, example sensor modules 360 can be adjustable so that parameters measured by a sensor of a sensor module 360 can be targeted to a particular volume of space relative to the light fixture 302. Example embodiments allow for the safe and effective coupling of one or more sensor modules 360 to the housing 303 of the light fixture 302 so that the sensor modules 360 can be disposed in the ambient environment, allowing for more effective monitoring, control, and prognostication of the light fixture 302 by the controller (e.g., controller 104).

Figure 6:
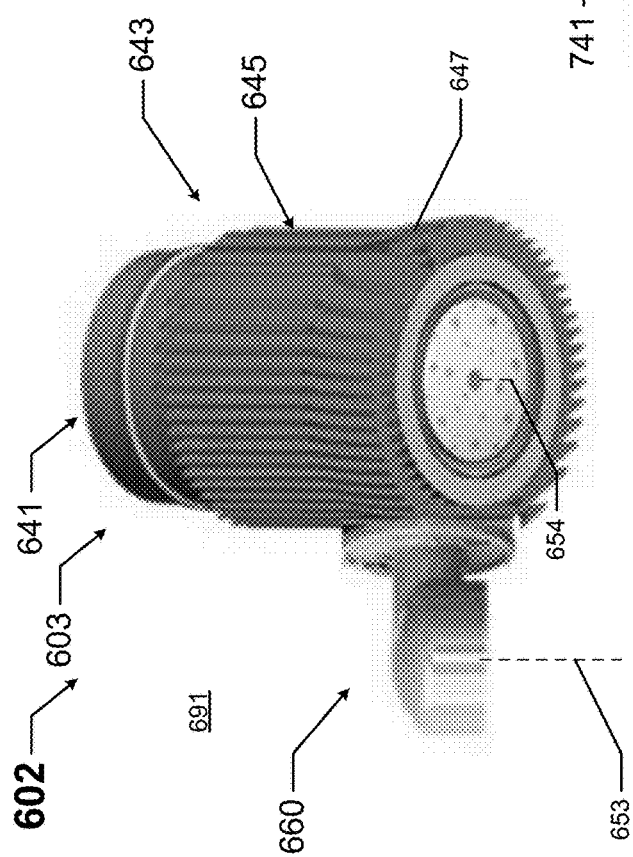
FIG. 6 shows still another light fixture in accordance with certain example embodiments.
Figure 7:
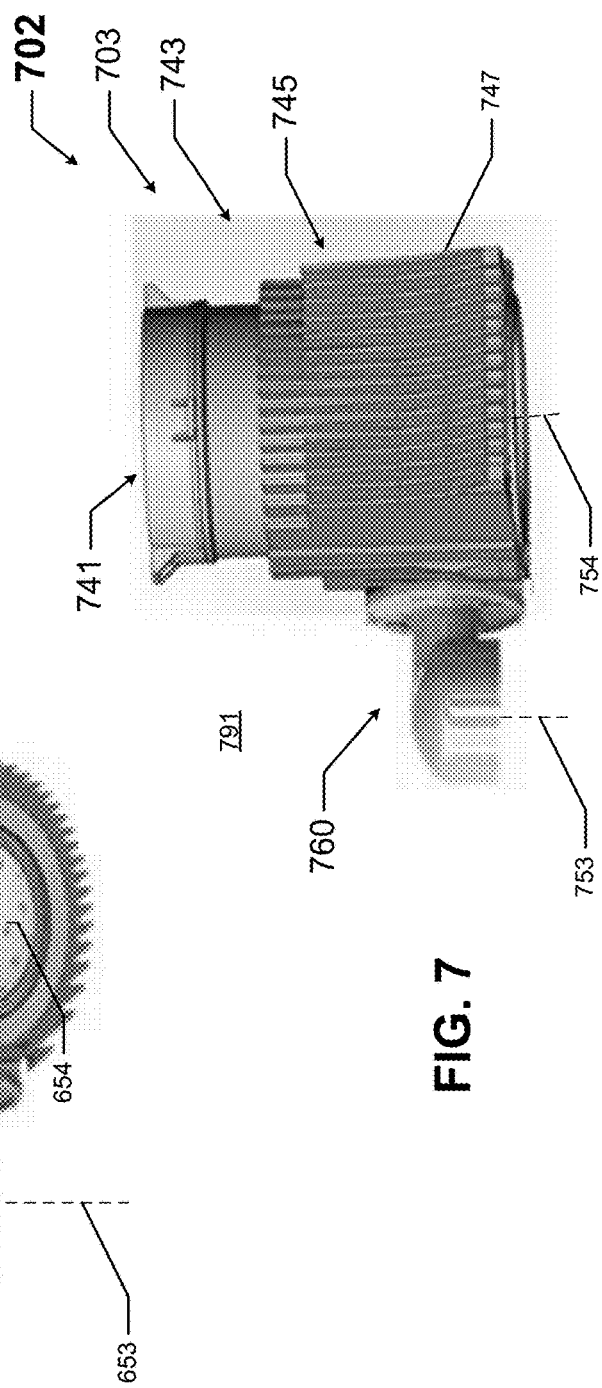
FIG. 7 shows yet another light fixture in accordance with certain example embodiments.
Figure 8:
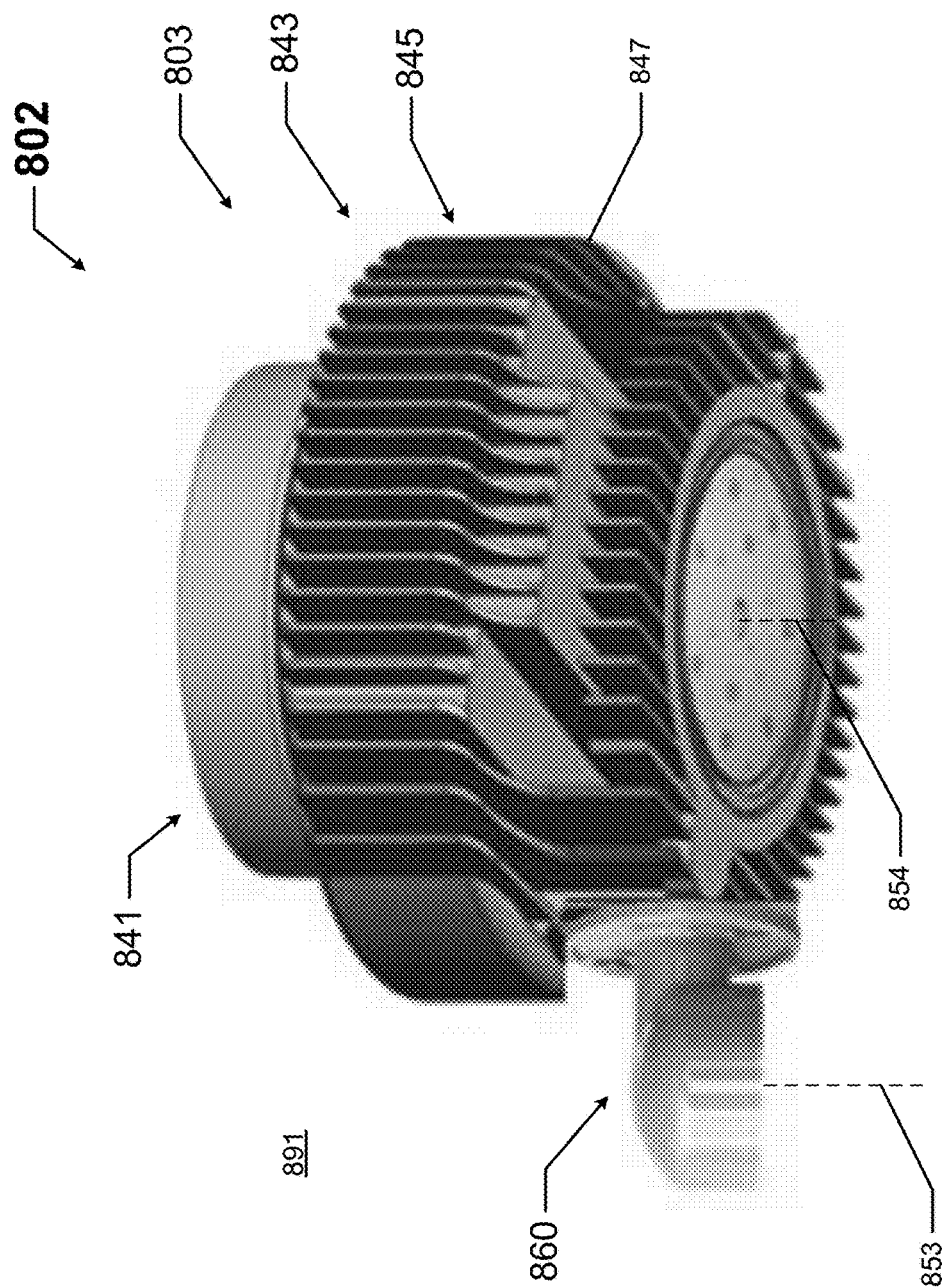
FIG. 8 shows still another light fixture in accordance with certain example embodiments.

The sensor module 360 can be coupled to the housing 303 using one or more of a number of coupling features. For example, in this case, the sensor module 360 can snap-connect to the mounting feature 369 of the housing 303. In certain example embodiments, when the sensor module 360 couples to the housing 303, the sensor module 360 can be moved (e.g., rotated, angled up, angled down) in one or more of a number of directions relative to the housing 303. In this way, regardless of how the light fixture 302 is mounted (e.g., to a wall, to a pole, to a bracket), the sensor module 360 can be adjusted so that the sensor within the sensor module 360 is oriented (e.g., aimed) properly to operate effectively. For example, if the sensor of the sensor module 360 operates most effectively when it is pointed straight down toward the ground, the sensor module 360 can be oriented in such a way as to allow for this, even if the housing 303 of the light fixture 302 is not mounted along a truly vertical axis. Examples of this are shown in FIGS. 6-8 below.

Further, the antenna assembly 339 of the light fixture 302 of FIG. 3 is mounted inside a cavity formed by the lens 351 adjacent to the light sources 342. For example, in this case, the distal part of the antenna assembly 339 protrudes through an aperture in the circuit board 348 on which the light sources 342 are disposed. Since the antenna assembly 339 is disposed behind the lens 351, the lens 351 serves to act as both a diffuser for the light emitted by the light sources 342 and to protect the antenna assembly 339. The antenna assembly 339 in this example can be shaped and sized in such a way as to have minimal or no effect on the light emitted by the light sources 342.

FIG. 3 also shows an identification component 378 (e.g., a sticker, a nameplate) that is affixed to the outer surface of a light fixture 302. Here, the identification component 378 is sticker that is adhered to part of the outer surface of portion 341 of the housing 303 of the light fixture 302. The identification component 378 can include information about the light fixture 302. Such information can include, but is not limited to, a manufacturer name and address, a voltage rating, a current rating, maximum lumen output, a model number, a serial number, and a NEMA rating.

Figure 4:
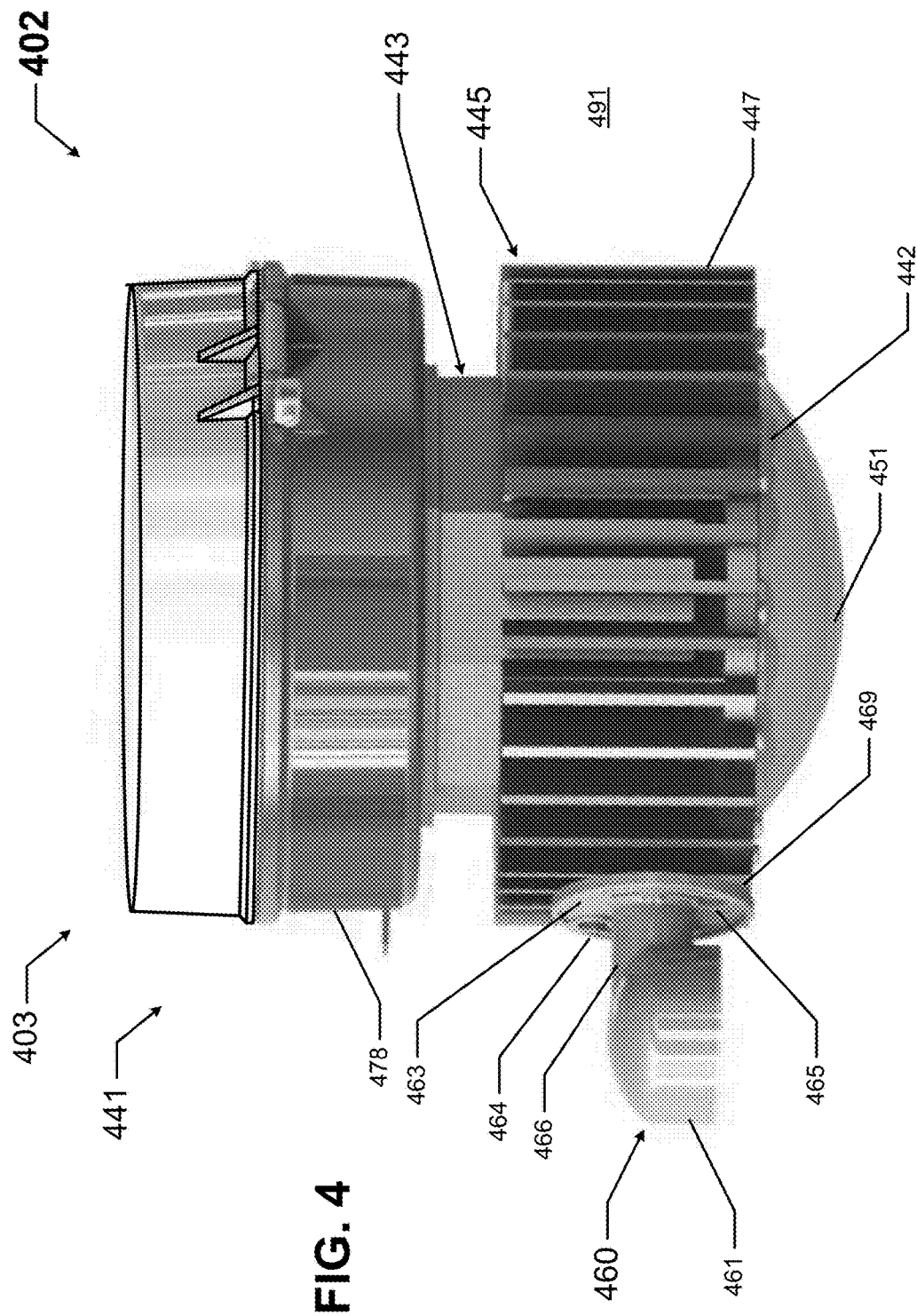
FIG. 4 shows another light fixture in accordance with certain example embodiments.

FIG. 4 shows another light fixture 402 in accordance with certain example embodiments. Referring to FIGS. 1-4, similar to the housing 303 of FIG. 3, the housing 403 of the light fixture 402 of FIG. 4 has two sections: Section 441 and section 443. Further, like the light fixture 302 of FIG. 3, the light fixture 402 of FIG. 4 has a heat sink assembly 445 disposed over a portion of section 443 of the housing 403. In this case, the heat sink fins 447 are disposed as vertically-oriented protrusions along the entire outer perimeter of the section 443 of the housing 403. The light fixture 402 is located in an ambient environment 491, which can be a hazardous environment.

There is also a sensor device 460 coupled to the housing 403. To accommodate this coupling, there is a mounting feature 469 disposed at the distal end of two or more adjacent heat sink fins 447 that allow the sensor module 460 to couple to the housing 403. In this case, the mounting feature 469 can include one or more coupling features (in this case, apertures that are hidden from view) that align with complementary coupling features 464 (in this case, slots that traverse a flange 463 in the sensor module 460). In addition to the flange 463, the sensor module 460 includes an extension 466 disposed between the flange 463 and the housing 461. One or more fastening devices 465 (a form of coupling feature) are used to couple the sensor module 460 to the mounting feature 469, where each fastening device 465 is disposed through a coupling feature 464 (in this case, a slot) in the flange 463 of the sensor module 460 and a coupling feature (in this case, an aperture) in the mounting feature 469. By using slots for the coupling features 464 in the flange 463 of the sensor module 460, the sensor module 460 can be rotated about an axis formed by the extension 466 (i.e., along the slots formed as the coupling features 464) to help properly align the sensor of the sensor module 460 relative to the housing 403 of the light fixture 402.

One other feature of the light fixture 402 of FIG. 4 is a lens 451 that is used to diffuse light emitted by the light sources 442 of the light fixture 402, where the lens 451 and the light sources 442 are substantially similar to their counterparts of FIG. 3. There is also an identification component 478, substantially similar to the identification component 378 of FIG. 3, affixed to the section 441 of the housing 403.

Figure 5A:
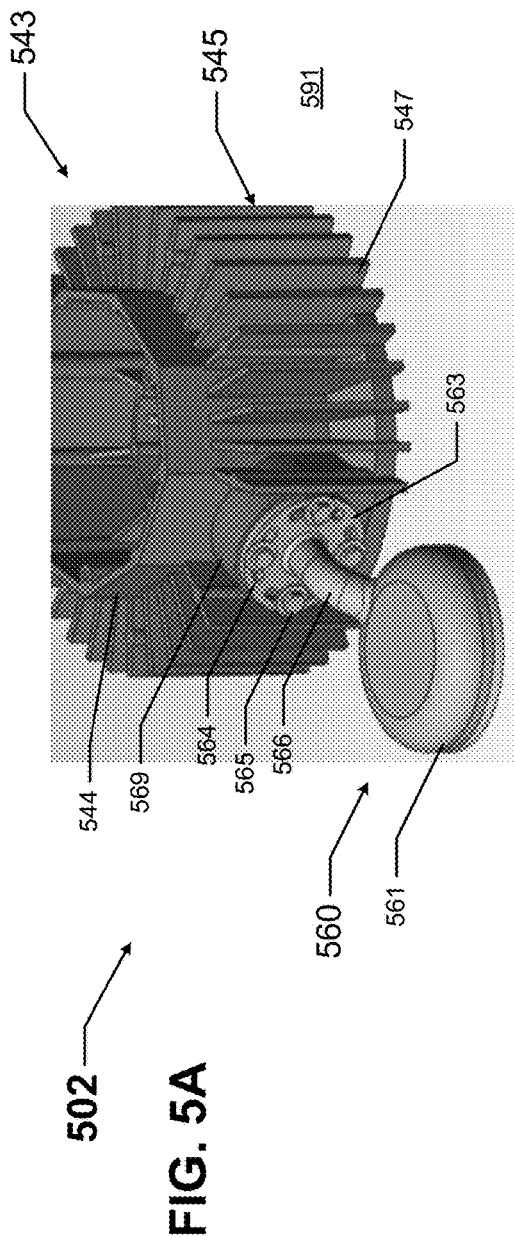
FIGS. 5A and 5B show yet another light fixture in accordance with certain example embodiments.
Figure 5B:
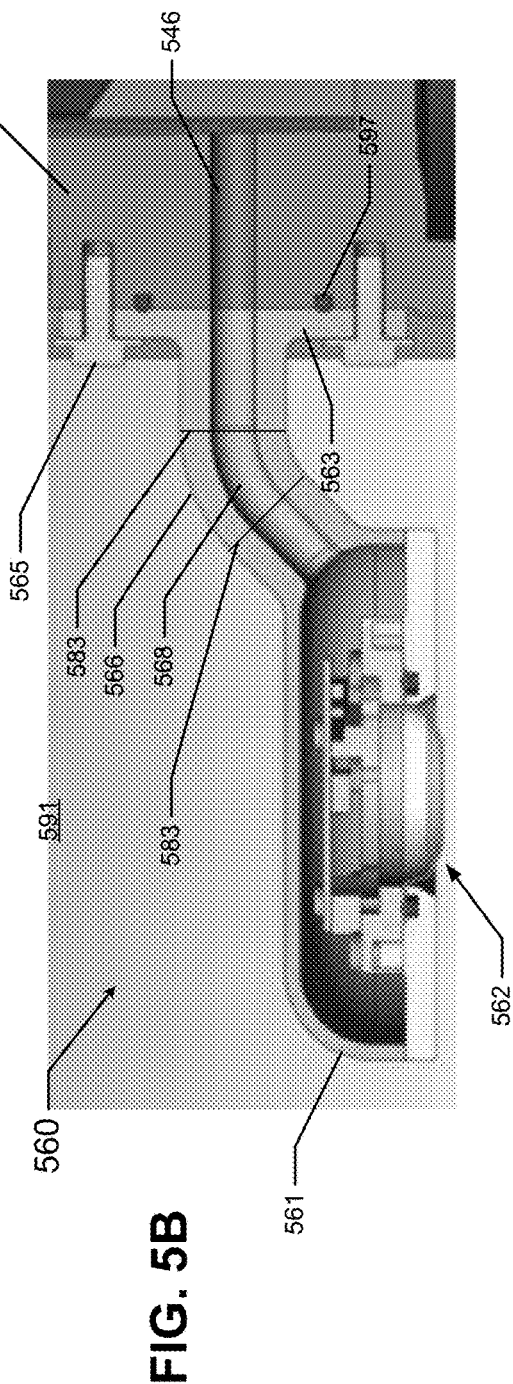

FIGS. 5A and 5B show a portion of a light fixture 502 in accordance with certain example embodiments. Specifically, FIG. 5A shows a top-side perspective view of the portion of the light fixture 502. FIG. 5B shows a cross-sectional side view of the sensor module 560 and the mounting feature 569. Referring to FIGS. 1-5B, the light fixture 502 of FIGS. 5A and 5B includes section 543 of a housing, a heat sink assembly 545 disposed on the outer surface of part of the section 543, and a sensor module 560 coupled to the mounting feature 569 of the section 543. The light fixture 502 is located in an ambient environment 591, which can be a hazardous environment. Without section 541 of the housing, FIG. 5A shows a cavity formed by the body 544 (made up of one or more walls) of section 543, where one or more components (e.g., electrical wiring, light sources) can be disposed. The heat sink fins 547 of FIGS. 5A and 5B are configured similar to the heat sink fins 347 of FIG. 3, in that the heat sink fins 547 are interrupted at the location where the mounting feature 569 is positioned to couple to the sensor module 560.

The sensor module 560 of FIGS. 5A and 5B is substantially similar to the sensor module 460 of FIG. 4, except as described below. For example, the flange 563 of the sensor module 560 has a number of coupling features 564 in the form of slots, through which a number of fastening devices 565 traverse to couple the sensor module 560 to the mounting feature 569. The extension 566 of the sensor module 560 of FIGS. 5A and 5B differs from the extension 466 of FIG. 4, at least, in that the extension 566 has a number of joints 583 that allow for rotational movement of the housing 561 relative to the flange 563 in at least one direction.

For example, a joint 583 can allow the housing 561 to rotate about an axis defined by the extension 566 adjacent to the joint 583. As another example, a joint 583 can allow the housing 561 to move up-and-down, side-to-side, and/or in any other direction relative to the flange 563. In such a case, the extension 566 can include one or more features (e.g., detents, locking pins, fastening sleeves) that allow the position of the housing 561 relative to the flange 563 to remain fixed once the housing 561 has been put into a desired position by a user (e.g., user 150) relative to the flange 563 (and so also the housing of the light fixture 502).

FIG. 5B also shows a channel 568 that runs through the extension 566 so that communication links (e.g., electrical conductors, electrical connectors) can be disposed therein. FIG. 5B also shows a sealing member 597 (e.g., a gasket, an o-ring, silicone) disposed between an outer surface of the flange 563 and the mounting feature 569. In such a case, the sealing member 597 can help maintain requirements for the light fixture, when coupled to the sensor module 560, to comply with applicable standards for a hazardous environment.

FIGS. 6-8 show other light fixtures in accordance with certain example embodiments. Referring to FIGS. 1-8, the light fixture 602 of FIG. 6 includes a housing 603 with section 641 and section 643. The light fixture 602 is located in an ambient environment 691, which can be a hazardous environment. Further, heat sink assembly 645 is disposed on the outer surface of section 643 and includes a number of vertically-oriented heat sink fins 647. There is a mounting feature 669 disposed at the distal end of two or more adjacent heat sink fins 647 that allow the sensor module 660 to couple to the housing 603. As such, the heat sink fins 647 are disposed along the entire outer perimeter of section 643. The sensor module 660 and its various components (e.g., sensor housing 661, extension 666, flange 663, coupling features 664) are substantially the same as the sensor module 460 of FIG. 4 and its corresponding components. Fastening devices 665 are used to couple the sensor module 660 to the mounting feature 669 of the housing 603 of the light fixture 602. Here, the sensor module 660 is directed along an axis 653 that is at an angle (approximately 45° deviation) relative to the axis 654 along which the housing 603 of the light fixture 602 is directed, thereby showing how the position of the example sensor module 660 is adjustable relative to the housing 603 of the light fixture 602.

The light fixture 702 of FIG. 7 includes a housing 703 with section 741 and section 743. The light fixture 702 is located in an ambient environment 791, which can be a hazardous environment. Further, heat sink assembly 745 is disposed on the outer surface of section 743 and includes a number of vertically-oriented heat sink fins 747. There is a mounting feature 769 disposed at the distal end of two or more adjacent heat sink fins 747 that allow the sensor module 760 to couple to the mounting feature 769 of the housing 703. As such, the heat sink fins 747 are disposed along the entire outer perimeter of section 743. The sensor module 760 and its various components (e.g., sensor housing 761, extension 766, flange 763, coupling features 764) are substantially the same as the sensor module 460 of FIG. 4 and its corresponding components. Fastening devices 765 are used to couple the sensor module 760 to the mounting feature 769 of the housing 703 of the light fixture 702. Here, the sensor module 760 is directed along an axis 753 that is almost parallel (approximately 5° deviation) with the axis 754 along which the housing 703 of the light fixture 702 is directed, again showing how the position of the example sensor module 760 is adjustable relative to the housing 703 of the light fixture 702.

The light fixture 802 of FIG. 8 includes a housing 803 with section 841 and section 843. The light fixture 802 is located in an ambient environment 891, which can be a hazardous environment. Further, heat sink assembly 845 is disposed on the outer surface of section 843 and includes a number of vertically-oriented heat sink fins 847. There is a mounting feature 869 disposed at the distal end of two or more adjacent heat sink fins 847 that allow the sensor module 860 to couple to the mounting feature 869 of the housing 803. As such, the heat sink fins 847 are disposed along the entire outer perimeter of section 843. The sensor module 860 and its various components are substantially the same as the sensor module 460 of FIG. 4 and its corresponding components. Fastening devices 865 are used to couple the sensor module 860 to the mounting feature 869 of the housing 803 of the light fixture 802. Here, the sensor module 860 is directed along an axis 853 that is almost parallel (approximately 15° deviation) with the axis 854 along which the housing 803 of the light fixture 802 is directed, again showing how the position of the example sensor module 860 is adjustable relative to the housing 803 of the light fixture 802.

Figure 9A:
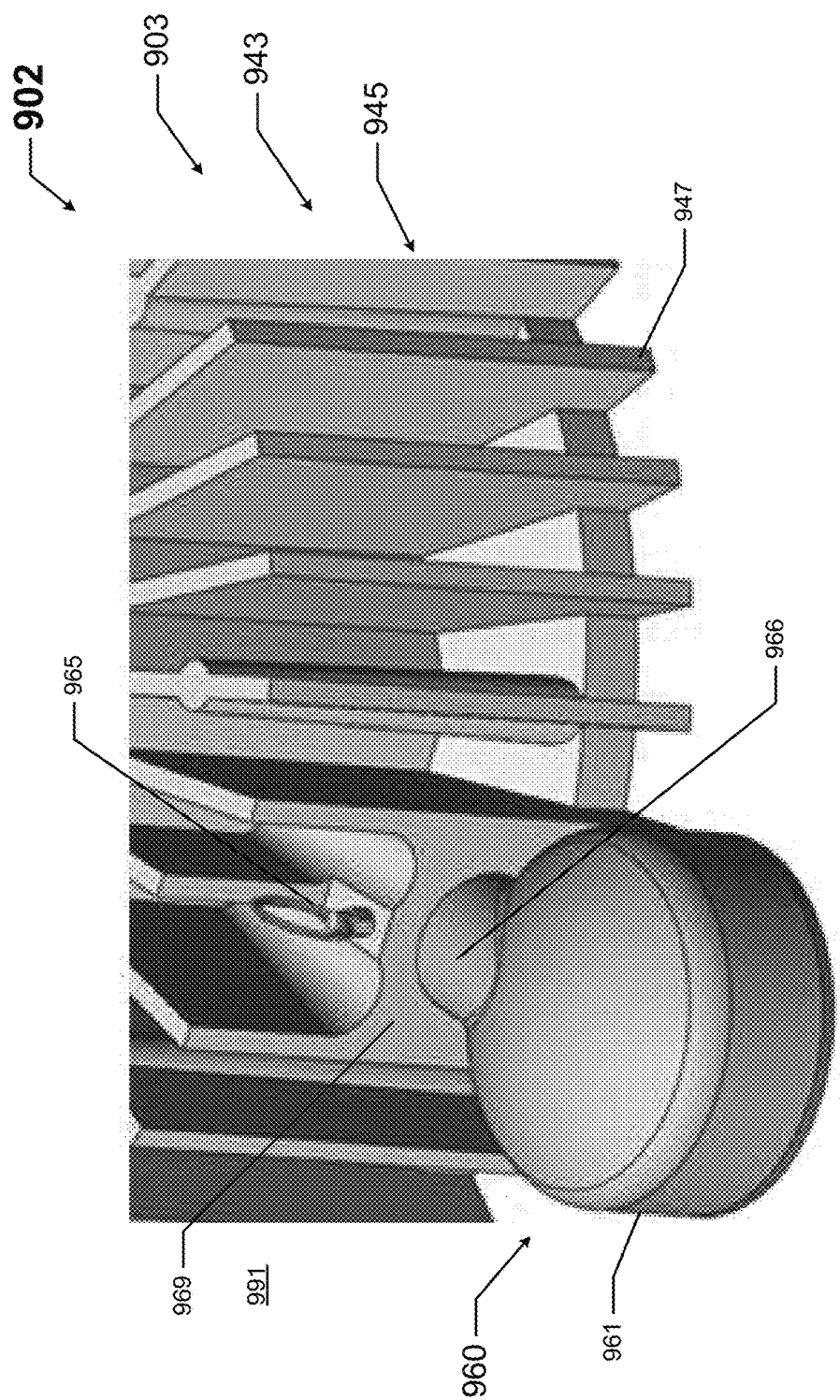
FIGS. 9A and 9B show yet another light fixture in accordance with certain example embodiments.
Figure 9B:
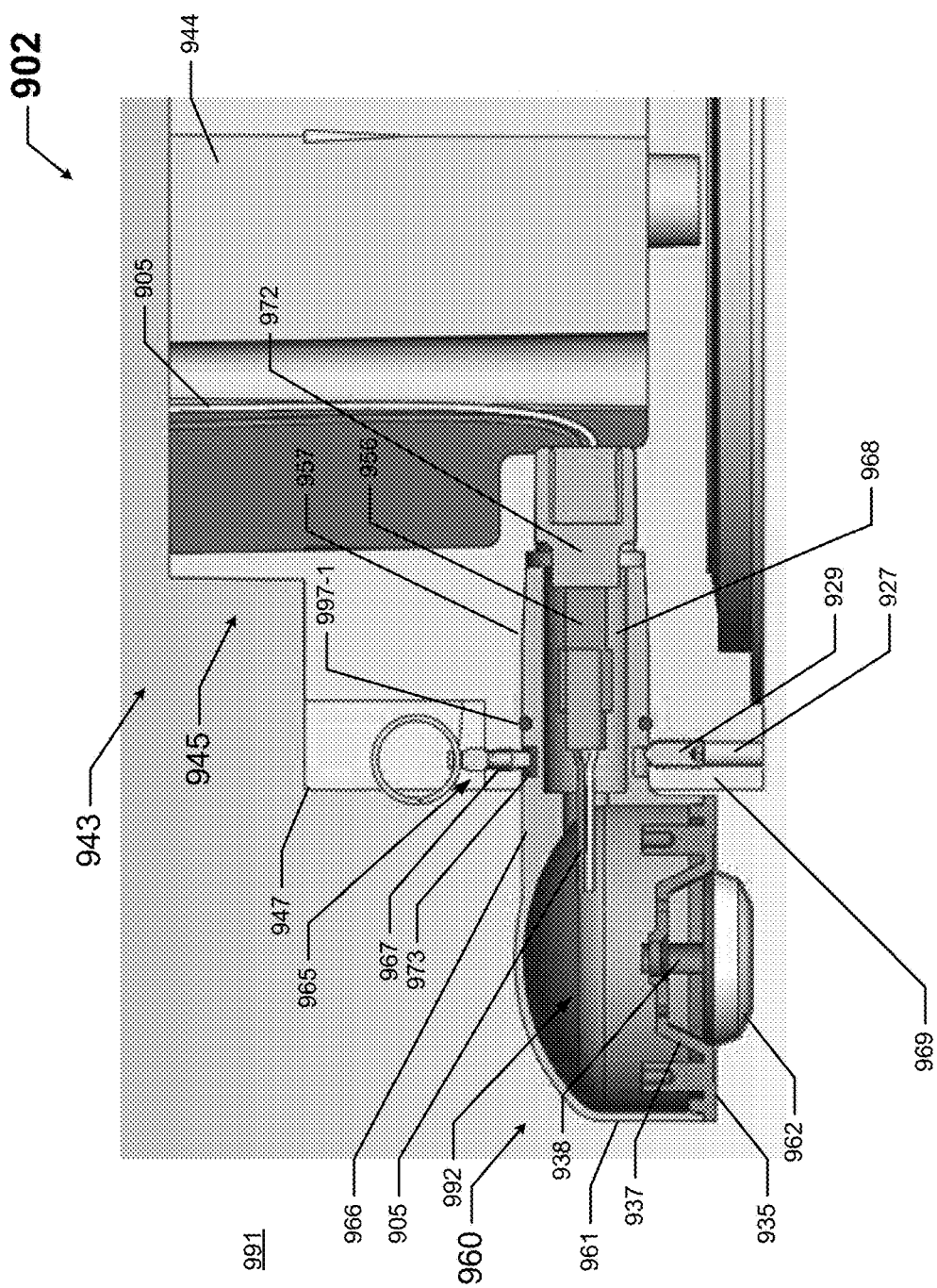

FIGS. 9A and 9B show a portion of yet another light fixture 902 in accordance with certain example embodiments. Specifically, FIG. 9A shows a top-side perspective view of the portion of the light fixture 902. FIG. 9B shows a cross-sectional side view of the portion of the light fixture 902. Referring to FIGS. 1-9B, the light fixture 902 of FIGS. 9A and 9B is substantially similar to the light fixtures of FIGS. 4 and 6-8, except as described below. For example, the light fixture 902 of FIGS. 9A and 9B includes a housing 903 with section 943. The light fixture 902 is located in an ambient environment 991, which can be a hazardous environment. Further, heat sink assembly 945 is disposed on the outer surface of section 943 and includes a number of vertically-oriented heat sink fins 947. There is a mounting feature 969 disposed at the distal end of two or more adjacent heat sink fins 947 that allow the sensor module 960 to couple to the mounting feature 969 of the housing 903. As such, the heat sink fins 947 are disposed along most of the entire outer perimeter of section 943.

The sensor module 960 of the light fixture 902 can be coupled to and decoupled from the mounting feature 969 disposed on the distal end of some of the heat sink fins 947 of the heat sink 945 disposed on the outer surface of the body 944 of the section 943 of the housing by a user (e.g., user 150) without the use of tools. Similarly, the position of the sensor module 960 relative to the section 943 of the housing 903 can be adjusted and fixed in place by a user without the use of tools. For example, when a sealing member 997-1 is disposed around the extension 966 within the coupling feature 957 of the mounting feature 969, the sealing member 997-1 can hold the sensor module 960 in a particular position relative to the housing 903 using friction, and so rotational adjustments can be made without tools. In addition, or in the alternative, there can be a securing member 929 (in this case, a set screw) disposed in an aperture 927 in the mounting feature 969 that can be secured with a tool (e.g., a screwdriver) to fix and/or adjust the position (e.g., rotational) of the sensor module 960 relative to the section 943 of the housing 903. Further, the mounting feature 969 can have multiple coupling features to secure the sensor module 960.

In this case, the coupling feature 967 of the mounting feature 969 disposed on the distal end of some of the heat sink fins 947 is an aperture that runs vertically through the mounting feature 969 and intersects a coupling feature 957 (in this case, a horizontal aperture) in the mounting feature 969. The coupling feature 957 in the mounting feature 969 receives the distal portion of the extension 966 of the sensor module 960, and the coupling feature 973 disposed in the extension 966 receives a fastening device 965 (a type of coupling feature). In this case, the fastening device 965 is a spring-activated pin with a pull ring at the top end of the pin. In some cases, there can be a number of coupling features 973 disposed around an outer perimeter and/or along a length of the extension 966, providing a number of positions that fastening device 965 can use to lock in a position of the sensor module 960 relative to the housing 903. As an alternative, the fastening device 965 can be a molded living hinge-style locking feature.

The extension 966 of the sensor module 960 in this case can have a coupling feature 956 disposed within the channel 968 and/or at the distal end of the extension 966. In this case, the coupling feature 956 of the sensor module 960 can be an electrical connector end that complements the coupling feature 972 (in this case, also an electrical connector end) of the mounting feature 969. When the extension 966 of the sensor module 960 is inserted into the coupling feature 957, and when coupling feature 956 of the sensor module 960 couples to coupling feature 972 of the mounting feature 969, fastening device 965 couples with coupling feature 973 disposed on the outer surface of the extension 966. In some cases, the channel 968 can be filled with one or more materials (e.g., potting compound) to provide an encapsulated mechanical safety barrier and to help the light fixture 902 comply with applicable standards for the ambient environment (e.g., a hazardous environment) in which the light fixture 902 is located.

In certain example embodiments, coupling feature 972 can include a barrier in the housing, where the barrier provides thermal isolation and can allow the electrical conductors of the coupling feature 972 to pass therethrough while preventing dust, gases, moisture, and other elements from passing therethrough. For example, the communication links 905 as well as at least a portion of the coupling feature 972 to which the communication links 905 are connected can be potted. Further, an electrical safety barrier (e.g., safety barrier 136, as described above) can be disposed in the housing 903 and allow only low levels of power to transfer to the sensor module 960, thereby preventing the sensor device 960 from becoming a source of ignition when the ambient environment 991 in which the light fixture 902 is disposed is hazardous.

In addition, or in the alternative, one or more sealing members 997 can be used to provide a barrier from the ambient environment 991. For example, as shown in FIG. 9B, the extension 966 of the sensor module 960 can have a channel disposed on its outer surface and into which a sealing member 997-1 can be disposed. In this way, the sealing member 997-1 can abut against an inner surface of the coupling feature 957 of the mounting feature 969 when the sensor module 960 is coupled to the housing 903. The sealing member 997-1 can also provide a friction fit to allow for rotational adjustment of the sensor module 960 relative to the housing 903 and maintain a relative position between the sensor module 960 and the housing 903.

In this case, coupling feature 973 is a slot, a detent, or hole that traverses some, but not all, of the thickness of the extension 966 and extends around some or all of the outer perimeter of the extension 966. In this way, when the extension 966 is inserted to a certain point within the coupling feature 957 of the mounting feature 969, the spring-activated pin of the coupling feature 965 enters into the coupling feature 973 and prevents the extension 966 from moving, at least inward or outward, and possibly rotationally, relative to the coupling feature 957 of the mounting feature 969. When the ring of the coupling feature 965 is pulled, the pin of the coupling feature 965 disengages from the coupling feature 973 of the extension 966, allowing the sensor module 960 to move within the coupling feature 957.

Coupling feature 972 can be filled with one or more materials (e.g., potting compound) to provide an encapsulated mechanical safety barrier and to help the light fixture 902 comply with applicable standards for the ambient environment (e.g., a hazardous environment) in which the light fixture 902 is located. Further, in some cases, the mounting feature 969 can include an internal feature (e.g., a separate channel) to separate the intrinsically safe area (the area of the receiving feature 969 adjacent to the encapsulated mechanical safety barrier provided in the coupling feature 972) and other types of electrical conductors within the housing 903 of the light fixture 902.

Further, as discussed above, coupling feature 972 of the mounting feature 969 and coupling feature 956 of the sensor module 960 in this case are electrical connector ends that complement each other. When the sensor module 960 is decoupled from the mounting feature 969 of the light fixture 902, coupling feature 972 and/or coupling feature 956 can be exposed to the ambient environment 991. In such a case, one or more mechanisms can be added to ensure the integrity of these coupling features and/or compliance with an applicable standard. Further, because of the intrinsic safety, provided by the encapsulated mechanical safety barrier at and/or around the coupling feature 972, leading to the receiving feature 969 and everything downstream (e.g., the sensor module 960), this design facilitates maintenance (e.g., adjustment, replacement) of the sensor module 960 during full operation without de-energization of the light fixture 902 or components (e.g., controller, power supply) thereof. In other words, a sensor module 960 can be removed while the rest of the light fixture 902 is energized and operational, without adversely affecting the operation of the rest of the light fixture 902. Similarly, a sensor module 960 can be coupled to the housing 903 while the light fixture 902 is energized and operational, without adversely affecting the operation of the rest of the light fixture 902.

For example, a movable cover can be disposed over the coupling feature 972 of the mounting feature 969 so that the coupling feature 972 is covered by the cover when the sensor module 960 is decoupled from the rest of the light fixture 902. As the sensor module 960 is about to be coupled to the rest of the light fixture 902, the cover can automatically be moved out of the way to allow coupling feature 972 and coupling feature 956 to become engaged. As the sensor module 960 is being decoupled from the rest of the light fixture 902, the cover can automatically recover the coupling feature 972.

As discussed above, the example sensor module 960 can include one or more of a number of components. For example, the sensor module 960 of FIG. 9B includes a housing 961 that forms a cavity 992. Within the cavity 992 of FIG. 9B is disposed a sensor 938 and a mount 937 on which the sensor 938 is disposed. Also disposed in the cavity 992 of the sensor module 960 are one or more communication links 905 (in this case, electrical conductors) that extend from the coupling feature 956 disposed within the channel 968 of the extension 966. In addition, a bezel 935 is coupled to the bottom end of the housing 961, and a lens 962 is disposed within the center of the bezel 935. The combination of the bezel 935 and the lens 962 encloses the cavity 992 of the sensor module 960.

Figure 10:
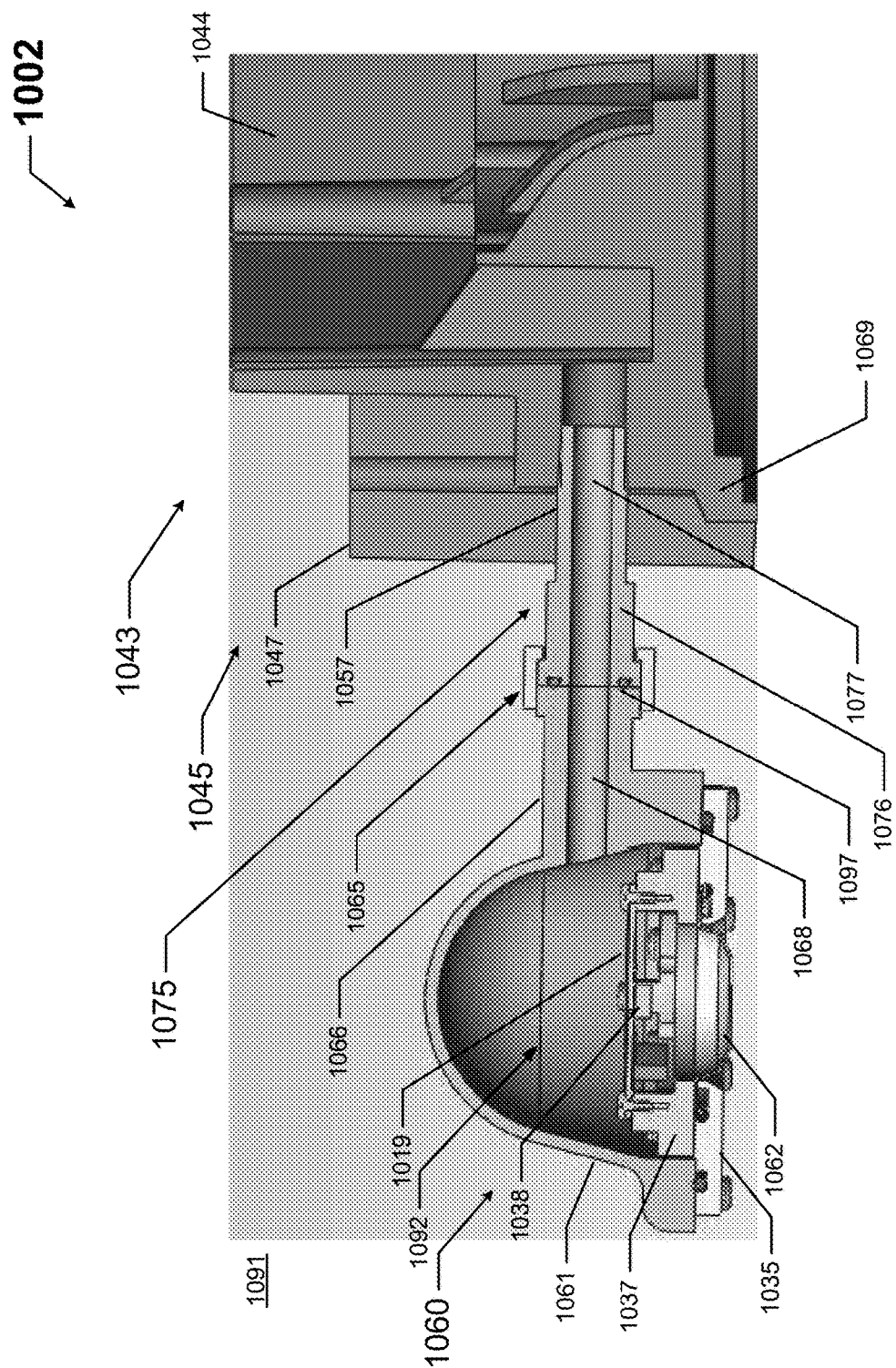
FIG. 10 shows still another light fixture in accordance with certain example embodiments.

FIG. 10 shows a cross-sectional side view of a portion of still another light fixture 1002 in accordance with certain example embodiments. Referring to FIGS. 1-10, the light fixture 1002 of FIG. 10 is substantially similar to the light fixtures described above, except as described below. For example, the light fixture 1002 of FIG. 10 includes a housing 1003 with section 1043. The light fixture 1002 is located in an ambient environment 1091, which can be a hazardous environment. Further, heat sink assembly 1045 is disposed on the outer surface of section 1043 and includes a number of vertically-oriented heat sink fins 1047. There is a mounting feature 1069 disposed on the wall 1044 of the section 1043 of the housing 1003 that allow the sensor module 1060 to couple to the mounting feature 1069 of the housing 1003.

The sensor module 1060 of FIG. 10 is not directly coupled to the mounting feature 1069. Instead, a bridge device 1075 is disposed between and coupled directly to the extension 1066 of the sensor module 1060 and the mounting feature 1069. The bridge device 1075 can have a body 1076 through which a channel 1077 is disposed along the length of the body 1076. The channel 1077 can be used to house one or more components (e.g., communication links such as electrical conductors, potting compound) of the light fixture 1002.

Further, each end of the bridge device 1075 can have any of a number of any type of coupling features. Such coupling features can be used to help ensure that the light fixture 1002 meets any applicable standards. In this example, the distal end of the bridge device 1075 couples to the mounting feature 1069 in a manner similar to how the extension 966 in FIGS. 9A and 9B couple to the mounting feature 969. The proximal end of the bridge device 1175 is coupled to the sensor module 1060 by abutting against the flange 1063 and the two ends being held together by a fastening device 1065 (in this case, a threaded collar). A sealing member 1097 can be disposed at the junction of where the flange 1063 abuts against the proximal end of the body 1076 of the bridge device 1075.

As discussed above, the example sensor module 1060 can include one or more of a number of components. For example, the sensor module 1060 of FIG. 10 includes a housing 1061 that forms a cavity 1092. Within the cavity 1092 of FIG. 10 is disposed a sensor 1038 and a mount 1037 on which the sensor 1038 is disposed, and a circuit board 1019 disposed adjacent to the sensor 1038. In addition, a bezel 1035 is coupled to the bottom end of the housing 1061, and a lens 1062 is disposed within the center of the bezel 1035. The combination of the bezel 1035 and the lens 1062 encloses the cavity 1092 of the sensor module 1060.

Figure 11:
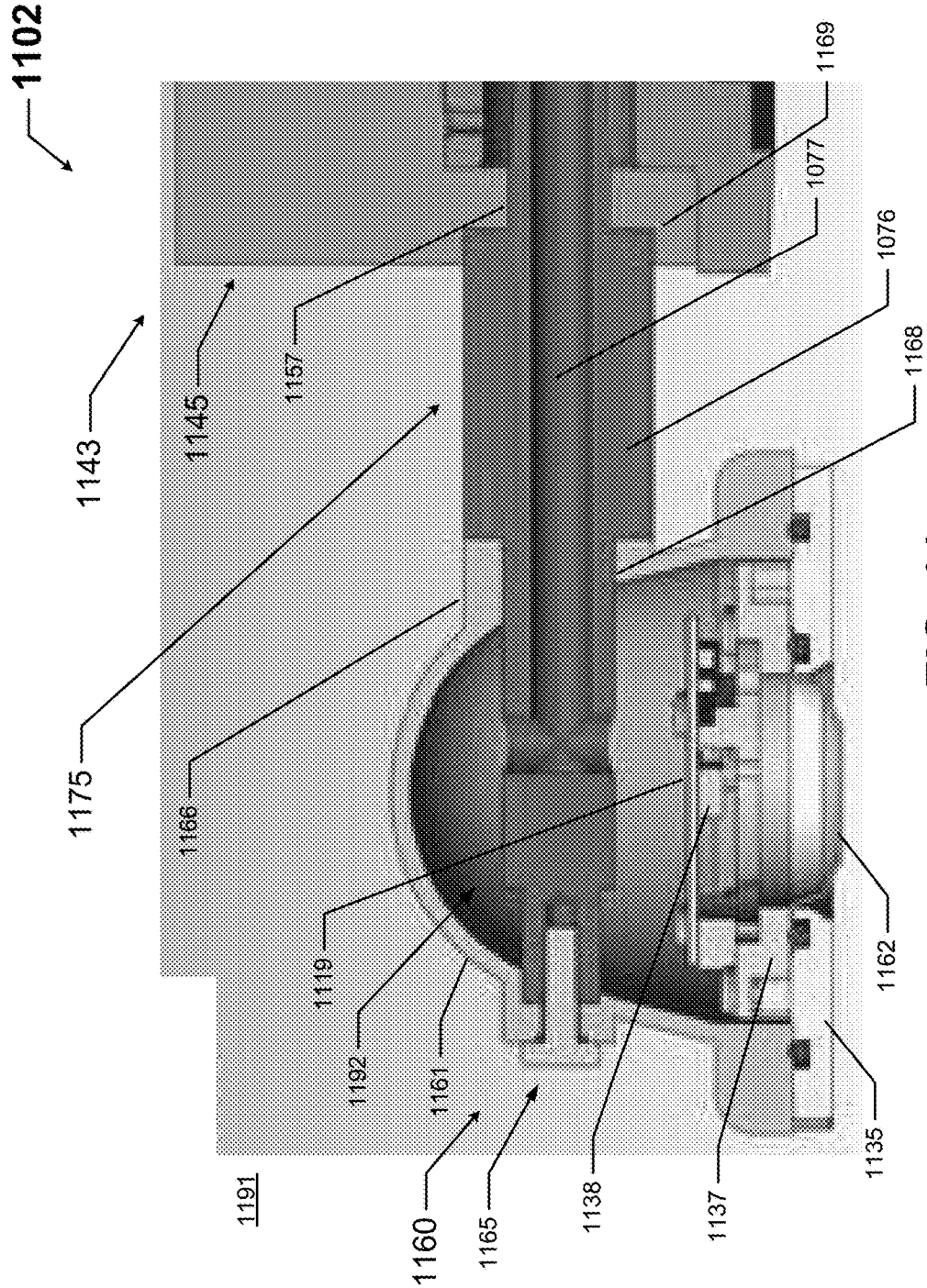
FIG. 11 shows yet another light fixture in accordance with certain example embodiments.

FIG. 11 shows a cross-sectional side view of a portion of yet another light fixture 1102 in accordance with certain example embodiments. Referring to FIGS. 1-11, the light fixture 1102 of FIG. 11 is substantially similar to the light fixtures described above, except as described below. For example, the light fixture 1102 of FIG. 11 includes a housing 1103 with section 1143. The light fixture 1102 is located in an ambient environment 1191, which can be a hazardous environment. Further, heat sink assembly 1145 is disposed on the outer surface of section 1143 and includes a number of vertically-oriented heat sink fins 1147. There is a mounting feature 1169 disposed at the distal end of two or more adjacent heat sink fins 1147 that allow the sensor module 1160 to couple to the mounting feature 1169 of the housing 1103. As such, the heat sink fins 1147 are disposed along the entire outer perimeter of section 1143.

As with the light fixture 1002 of FIG. 10, a bridge device 1175 is disposed between and coupled directly to the extension 1166 of the sensor module 1160 and the mounting feature 1169. In this case, however, the proximal end of the bridge device 1175 extends beyond the extension 1166 and within the cavity 1192 formed by the housing 1161 of the sensor module 1160. In such a case, one or more coupling features 1186 (in this case, an aperture) can be used to couple the proximal end of the bridge device 1175 to the sensor module 1160. In this example, a fastening device 1181 traverses the coupling feature 1186 of the sensor module 1160 and is disposed within a coupling feature 1182 (in this case, a threaded aperture) in the proximal end of the bridge device 1175 to couple the bridge device 1175 and the sensor module 1160 to each other.

As discussed above, the example sensor module 1160 can include one or more of a number of components. For example, the sensor module 1160 of FIG. 11 includes a housing 1161 that forms a cavity 1192. In addition to part of the bridge device 1175, within the cavity 1192 of FIG. 11 is disposed a sensor 1138 and a mount 1137 on which the sensor 1138 is disposed, and a circuit board 1119 disposed adjacent to the sensor 1138. In addition, a bezel 1135 is coupled to the bottom end of the housing 1161, and a lens 1162 is disposed within the center of the bezel 1135. The combination of the bezel 1135 and the lens 1162 encloses the cavity 1192 of the sensor module 1160.

Figure 12:
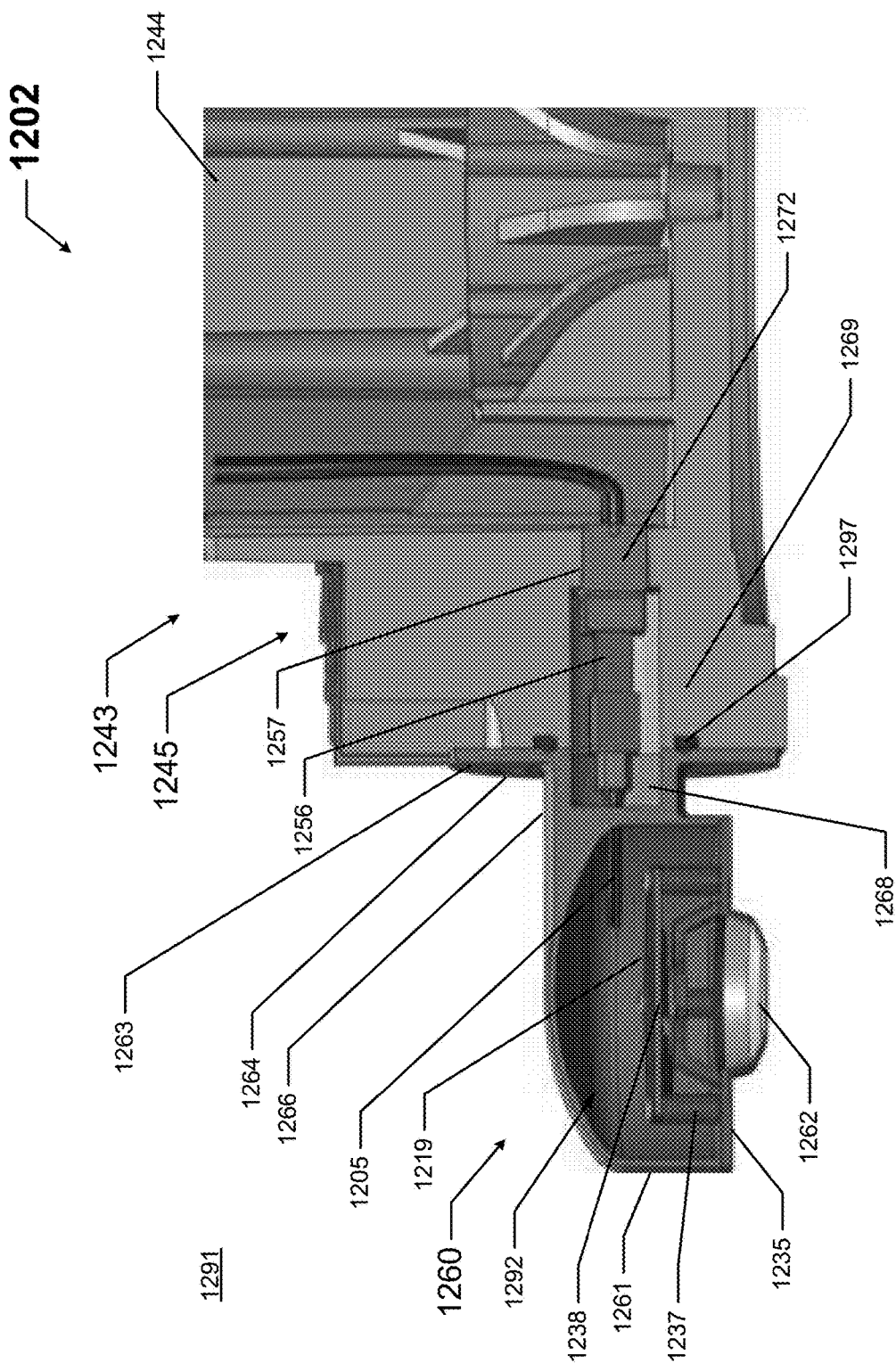
FIG. 12 shows still another light fixture in accordance with certain example embodiments.

FIG. 12 shows a cross-sectional side view of a portion of still another light fixture 1202 in accordance with certain example embodiments. Referring to FIGS. 1-12, the light fixture 1202 of FIG. 12 is substantially similar to the light fixtures described above, except as described below. For example, the light fixture 1202 of FIG. 12 includes a housing 1203 with section 1243. The light fixture 1202 is located in an ambient environment 1291, which can be a hazardous environment. Further, heat sink assembly 1245 is disposed on the outer surface of section 1243 and includes a number of vertically-oriented heat sink fins 1247. There is a mounting feature 1269 disposed at the distal end of two or more adjacent heat sink fins 1247 that allow the sensor module 1260 to couple to the mounting feature 1269 of the housing 1203. As such, the heat sink fins 1247 are disposed along the entire outer perimeter of section 1243.

The sensor module 1260 mechanically couples to the mounting feature 1269 in a manner substantially similar to what is described above with respect to FIGS. 3-5B, and the sensor module 1260 is electrically coupled to the rest of the light fixture 1202 in a manner substantially similar to what is described above with respect to FIGS. 9A and 9B. In this case, the mounting feature 1269 can include one or more coupling features (in this case, apertures that are hidden from view) that align with complementary coupling features 1264 (in this case, slots that traverse a flange 1263 in the sensor module 1260). In addition to the flange 1263, the sensor module 1260 includes an extension 1266 disposed between the flange 1263 and the housing 461.

One or more fastening devices 1265 (a form of coupling feature) are used to couple the sensor module 1260 to the mounting feature 1269, where each fastening device 1265 is disposed through a coupling feature 1264 (in this case, a slot) in the flange 1263 of the sensor module 1260 and a coupling feature (in this case, an aperture) in the mounting feature 1269. By using slots for the coupling features 1264 in the flange 1263 of the sensor module 1260, the sensor module 1260 can be rotated about an axis formed by the extension 1266 (i.e., along the slots formed as the coupling features 1264) to help properly align the sensor of the sensor module 1260 relative to the housing 1203 of the light fixture 1202.

In certain example embodiments, coupling feature 1272 can be substantially similar to coupling feature 972 discussed above. For example, coupling feature 1272, disposed within the channel 1257 of the mounting feature 1269 and coupled to coupling feature 1256, can include an encapsulated mechanical safety barrier, as described above, which isolates the sensor module 1260 so that the sensor module 1260 only needs to be intrinsically safe to comply with applicable standards. A sealing member 1297 can be disposed between the flange 1263 and the mounting feature 1269 to prevent the ambient environment 1291 from intruding into the sensor module 1260.

As discussed above, the example sensor module 1260 can include one or more of a number of components. For example, the sensor module 1260 of FIG. 12 includes a housing 1261 that forms a cavity 1292. Within the cavity 1292 of FIG. 12 is disposed a sensor 1238, a mount 1237 on which the sensor 1238 is disposed, and a circuit board 1219 disposed proximate to the sensor 1238. Also disposed in the cavity 1292 of the sensor module 1260 are one or more communication links 1205 (in this case, electrical conductors) that extend from the coupling feature 1256 disposed within the channel 1268 of the extension 1266. In addition, a bezel 1235 is coupled to the bottom end of the housing 1261, and a lens 1262 is disposed within the center of the bezel 1235. The combination of the bezel 1235 and the lens 1262 encloses the cavity 1292 of the sensor module 1260.

Figure 13A:
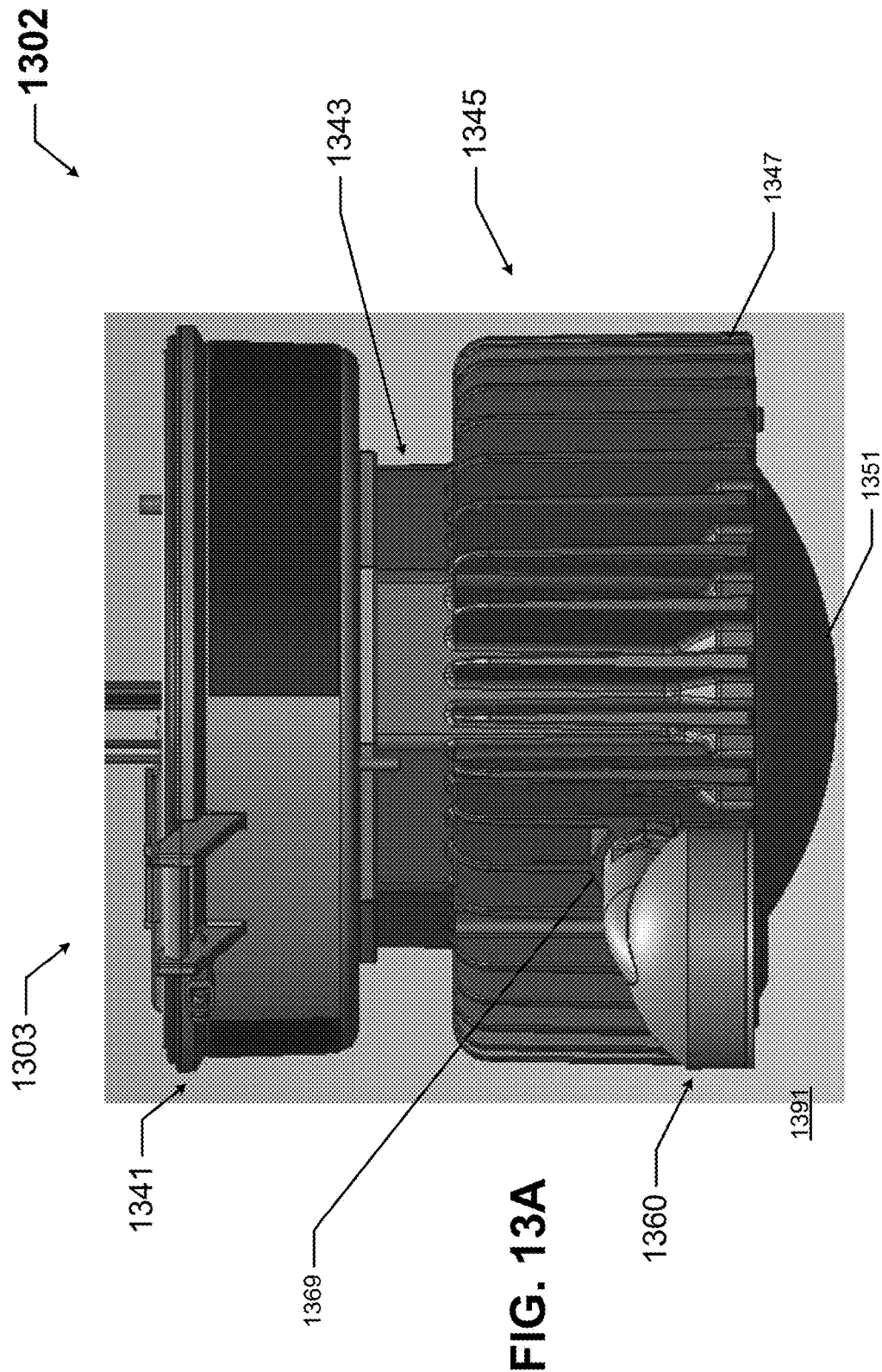
FIGS. 13A and 13B show yet another light fixture in accordance with certain example embodiments.
Figure 13B:
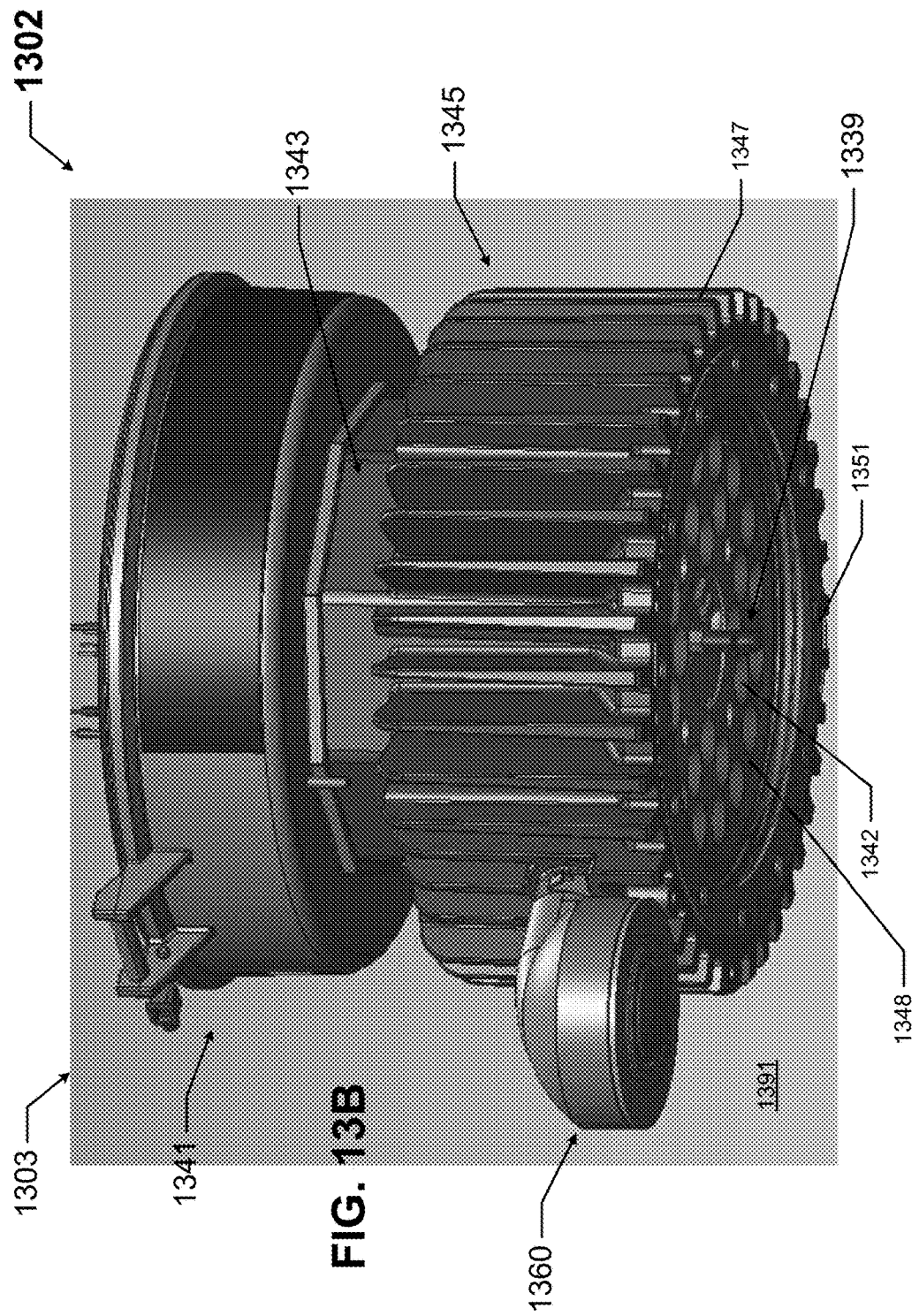
Figure 14A:
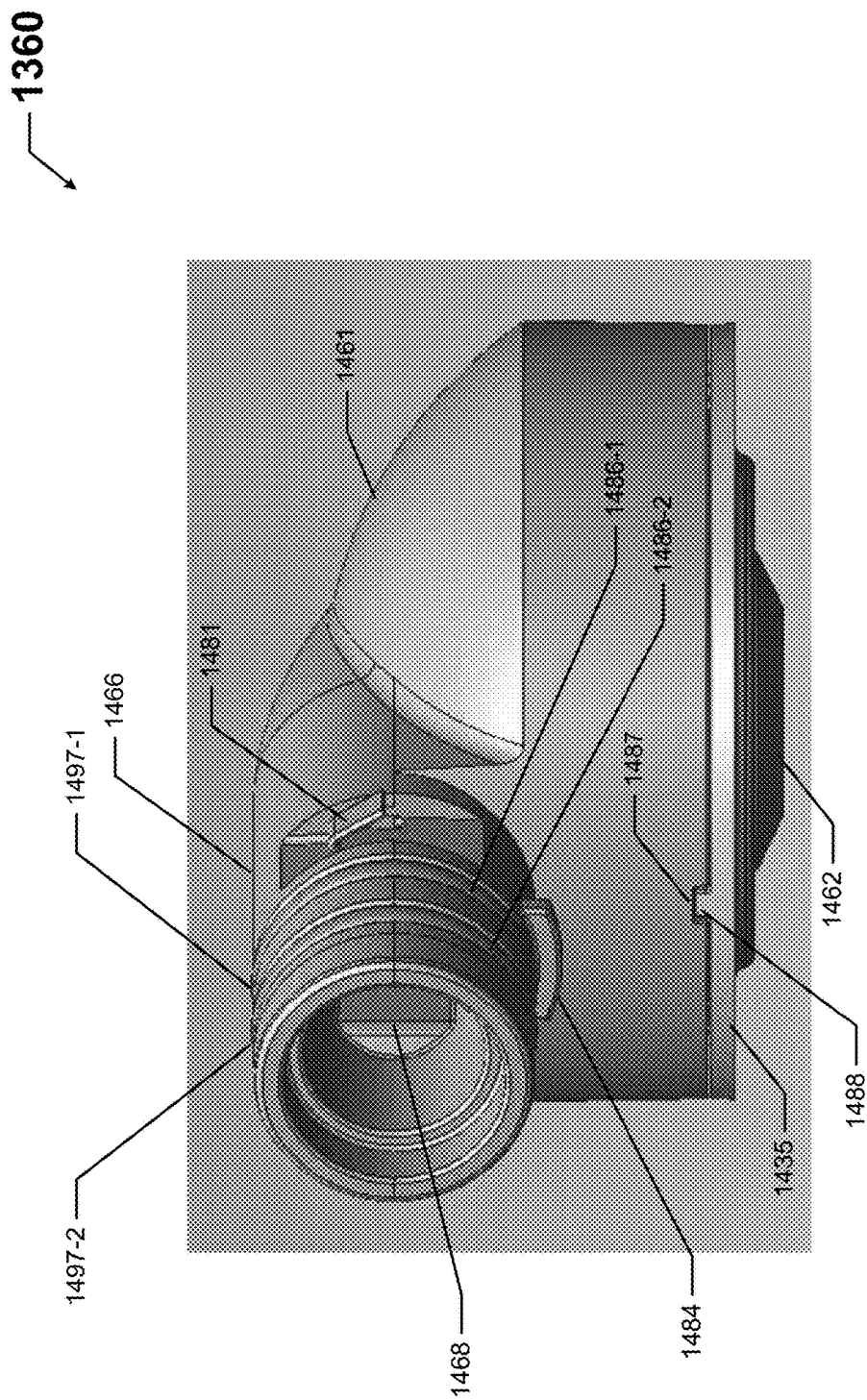
FIGS. 14A-14C show the sensor module of FIGS. 13A and 13B in accordance with certain example embodiments.
Figure 14B:
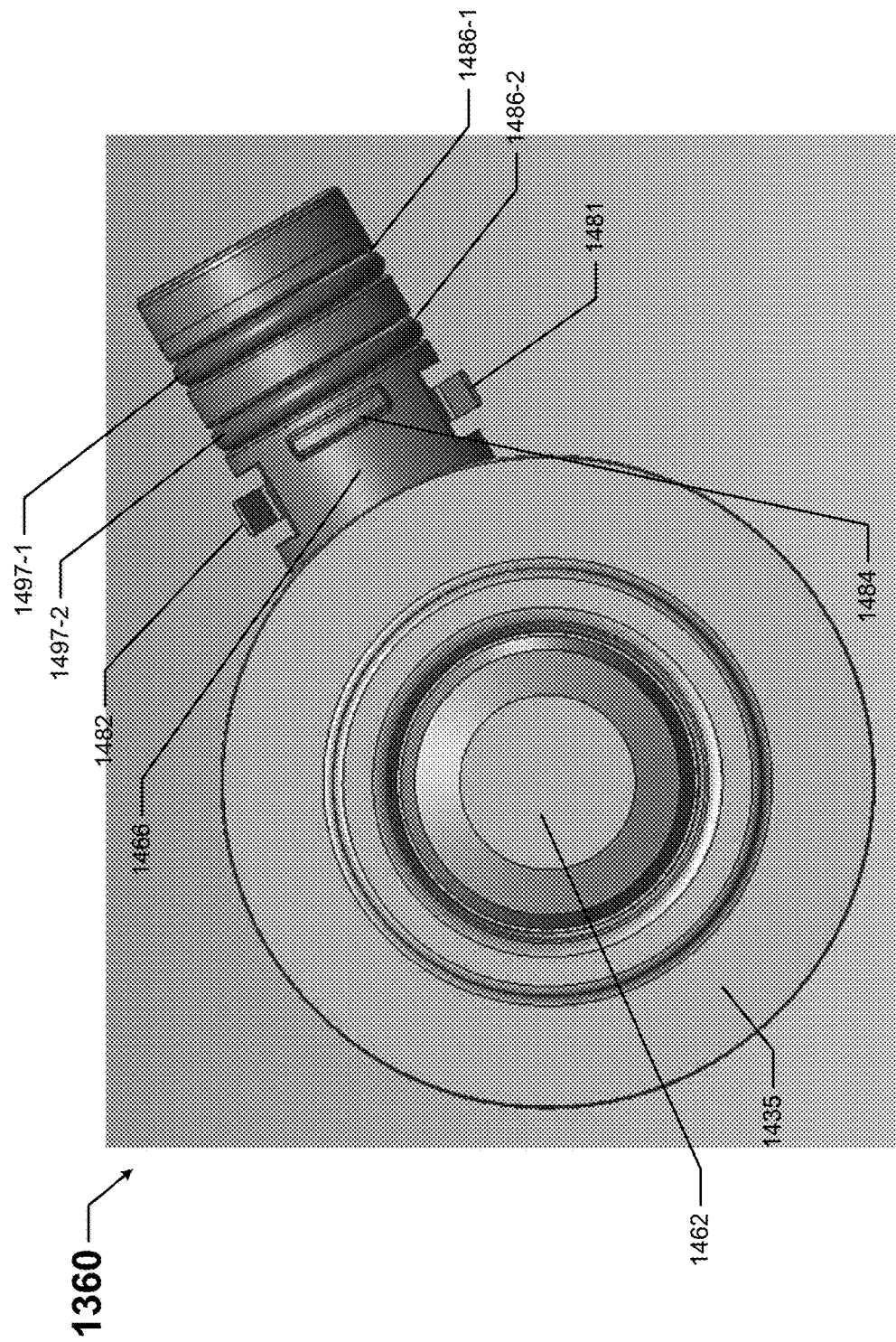
Figure 14C:
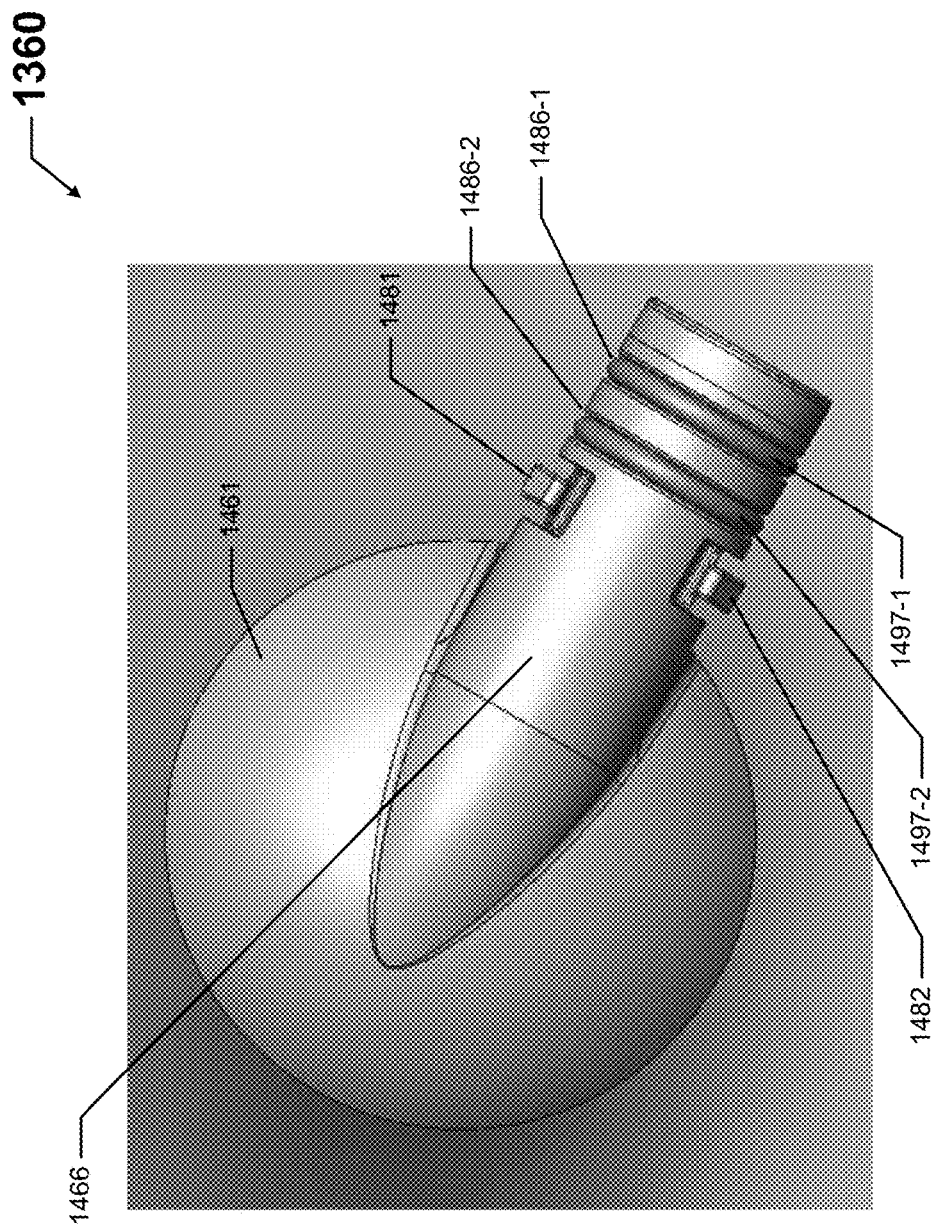

FIGS. 13A and 13B show yet another light fixture 1302 in accordance with certain example embodiments. Specifically, FIG. 13A shows a side view of the light fixture 1302. FIG. 13B shows a bottom-side perspective view of the light fixture 1302. In addition, FIGS. 14A-14C show the sensor module 1360 of FIGS. 13A and 13B in accordance with certain example embodiments. Specifically, FIG. 14A shows a rear-side view of the sensor module 1360. FIG. 14B shows a bottom view of the sensor module 1360. FIG. 14C shows a top view of the sensor module 1360.

Figure 15B:
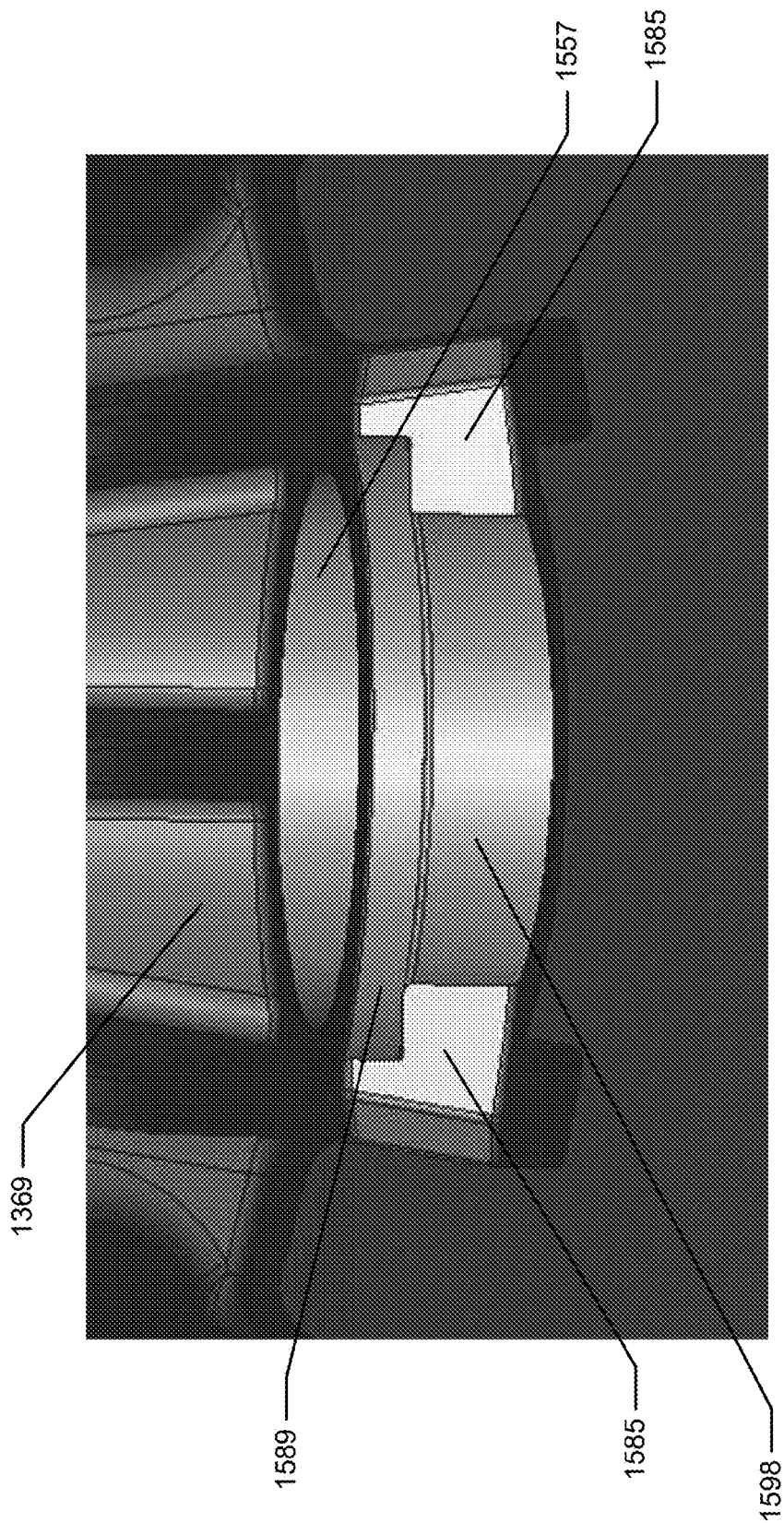
Figure 16D:
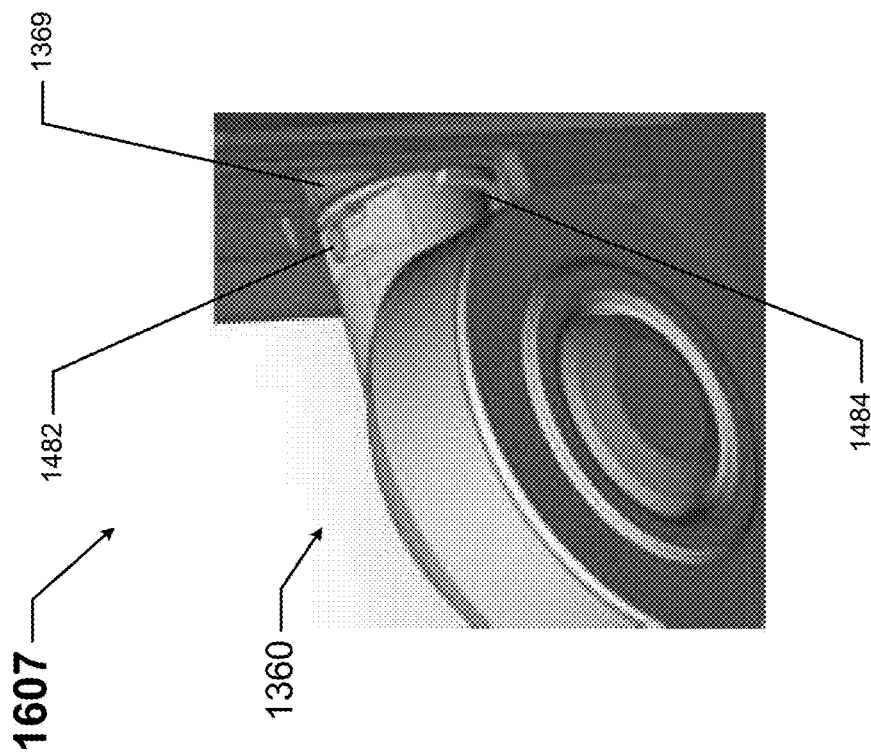

Further, FIGS. 15A and 15B show part of the light fixture 1302 of FIGS. 13A and 13B in accordance with certain example embodiments. Specifically, FIG. 15A shows a front-side view of the light fixture 1302 without the sensor module 1360. FIG. 15B shows a detailed top view of the mounting feature 1369. In addition, FIGS. 16A-16H show detailed views of the light fixture 1302 of FIGS. 13A and 13B in accordance with certain example embodiments. Specifically, FIG. 16A shows a front-side perspective view of the sensor module 1360 decoupled from the mounting feature 1369. FIGS. 16B-16F show a front-side perspective view of the sensor module 1360 coupled to the mounting feature 1369 and in various positions relative to the mounting feature 1369. FIGS. 16G and 16H show a cross-sectional side view of the sensor module 1360 coupled to the mounting feature 1369.

Referring to FIGS. 1-16H, the light fixture 1302 of FIG. 13 is substantially similar to the light fixtures described above, except as described below. For example, the light fixture 1302 of FIG. 13 includes a housing 1303 with section 1341 and section 1343. The light fixture 1302 is located in an ambient environment 1391, which can be a hazardous environment. Further, heat sink assembly 1345 is disposed on the outer surface of section 1343 and includes a number of vertically-oriented heat sink fins 1347. There is a mounting feature 1369 disposed at the distal end of two or more adjacent heat sink fins 1347 that allow the sensor module 1360 to couple to the mounting feature 1369 of the housing 1303. As such, the heat sink fins 1347 are disposed along the entire outer perimeter of section 1343.

As shown in FIGS. 14A-15B, the sensor module 1360 and the mounting feature 1369 are configured differently than what has been shown and described above. In this case, the extension 1466 of the sensor module 1360 two opposing spring tabs (spring tab 1481 and spring tab 1482) disposed on opposing sides of the extension 1466 and oriented opposite each other. In addition, the extension 1466 includes a retention rib 1484 disposed on the bottom of the extension 1466. Further, the extension 1466 can have one or more channels 1486 disposed along its outer perimeter between the retention rib 1484 and the distal end of the extension 1466. In this case, the extension 1466 has two channels 1486 (channel 1486-1 and channel 1486-2) located adjacent and in parallel with each other, where channel 1486-1 has disposed therein a sealing member 1497-1 and channel 1486-2 has disposed therein a sealing member 1497-2.

The mounting feature 1369 of the housing 1303 is similar to what is described with respect to other mounting features above in that coupling feature 1557 (in this case, an aperture) can have another coupling feature 1572 (in this case, including an electrical connector and a barrier) disposed therein, where the coupling feature 1572 couples to a complementary coupling feature (not shown) of the sensor module 1360 and is substantially similar to the coupling feature 972 discussed above. The mounting feature 1369 also includes a platform 1585 that extends away from the distal end of the coupling feature 1557. The platform 1585 has disposed therein a first channel 1589 and a second channel 1598, where the first channel 1589 is deeper, longer, and narrower compared to the second channel 1598. Further, channel 1589 is disposed adjacent to the distal end of the coupling feature 1557, and channel 1598 is disposed adjacent to channel 1589 away from the distal end of the coupling feature 1557. Also, channel 1598 is centered on platform 1585, so that platform 1585 extends upward relative to channel 1598 on both sides of channel 1598.

As shown in FIGS. 14A-16F, the features (e.g., spring tab 1481, spring tab 1482, retention rib 1484, sealing member 1497-1, sealing member 1497-2) on the extension 1466 of the sensor module 1360, when combined with the features (e.g., coupling feature 1557, platform 1585, channel 1589, channel 1598) of the mounting feature 1369, allow for retention and angular adjustment of the sensor module 1360 relative to the housing 1303. Specifically, when the extension 1466 of the sensor module 1360 is properly inserted into the coupling feature 1557 of the mounting feature 1369, the retention rib 1484 of the extension 1466 of the sensor module 1360 is disposed within and engages the channel 1598 of the mounting feature 1369.

In addition, spring tab 1481 and spring tab 1482 of the extension 1466 of the sensor module 1360 interacts with platform 1585 and channel 1589 of the mounting feature 1369 as the sensor module 1360 is rotated within coupling feature 1557. When the sensor module 1360 is initially inserted into the mounting feature 1369, as shown in FIGS. 16A and 16B, the sensor module 1360 is substantially upside down (i.e., the lens 1462 is facing up) so that spring tab 1481, spring tab 1482, and retention rib 1484 avoid contact with the channel 1598, the channel 1589, and the platform 1585.

Figure 16C:
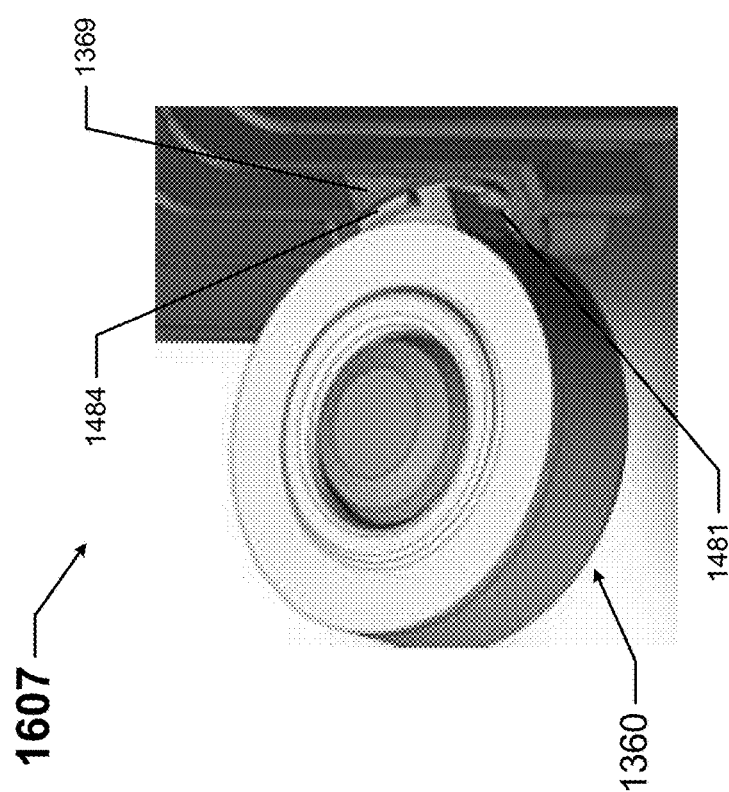
Figure 16F:
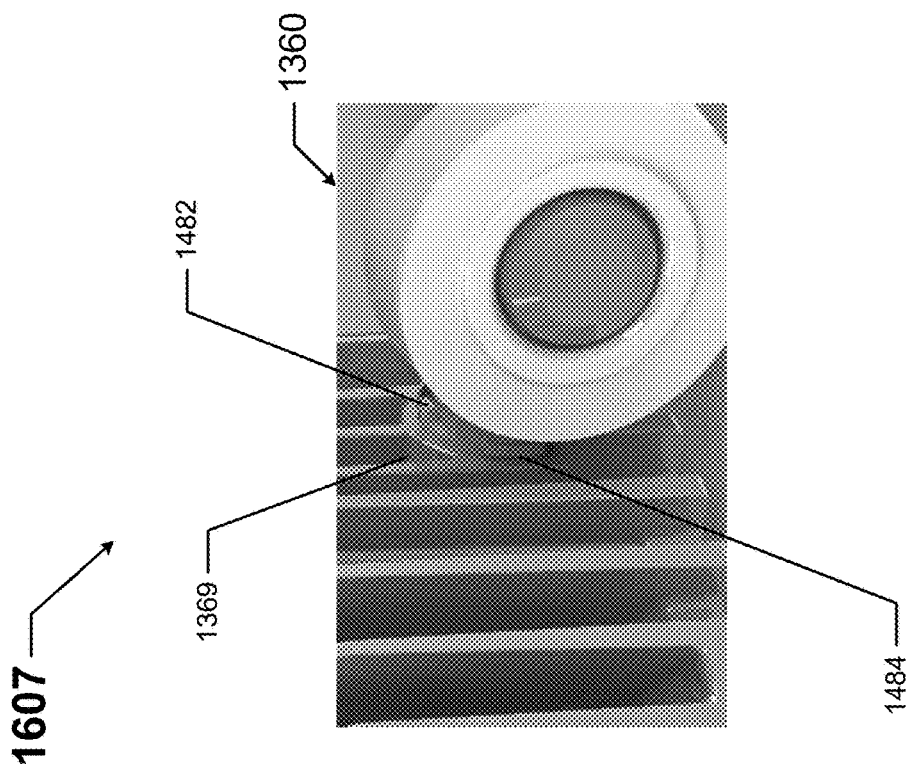
Figure 17:
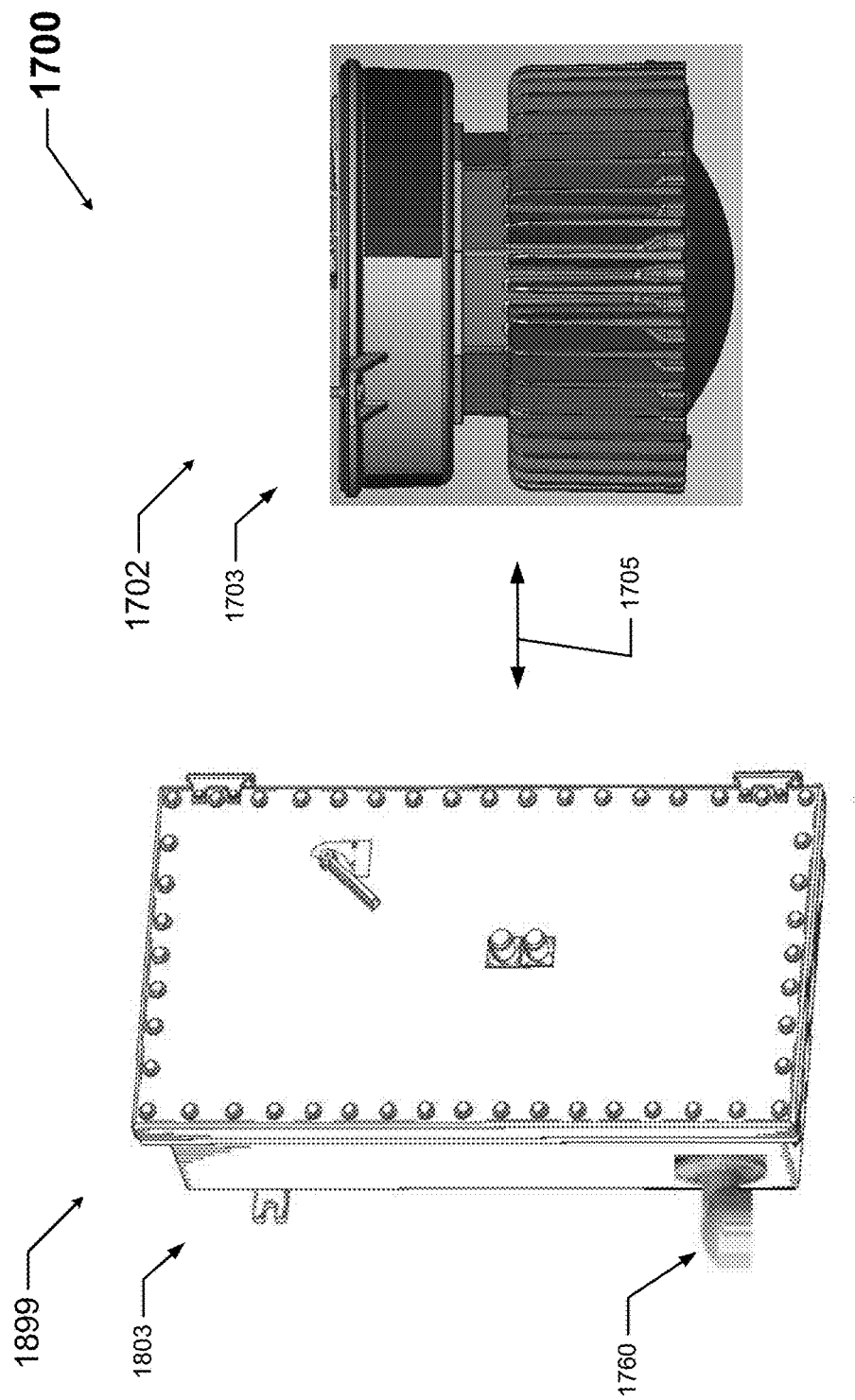
FIG. 17 shows a system that includes a light fixture and a sensor module in accordance with certain example embodiments.

As the sensor module 1360 is rotated in either direction (in this case, clockwise) into its desired position, as shown in FIGS. 16C and 16D, one of the spring tabs (in this case, spring tab 1482) approaches the right side of the platform 1585. At this point, the other spring tab (in this case, spring tab 1481) slides past the same side (in this case, the right side) of the platform and into channel 1598. At this point, the insertion and rotation of the sensor module 1360 relative to the mounting feature 1369 is done without tools and without manipulating spring tab 1481 or spring tab 1482. Also, as the sensor module 1360 rotates, the retention rib 1484 begins to engage channel 1589, which prevents the sensor module 1360 from being pulled out and away from the mounting frame 1369.

Figure 16E:
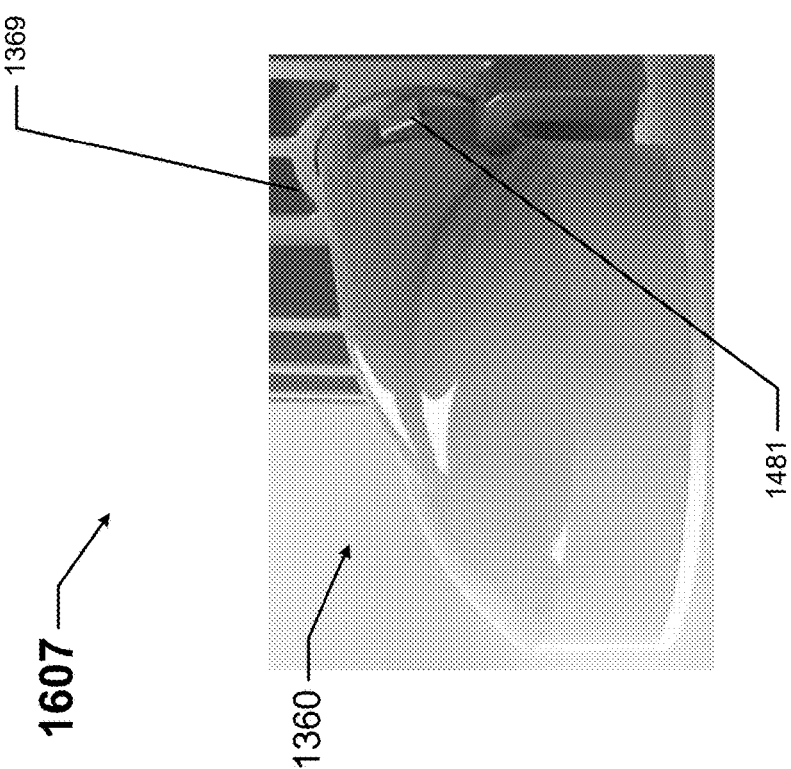
Figure 16G:
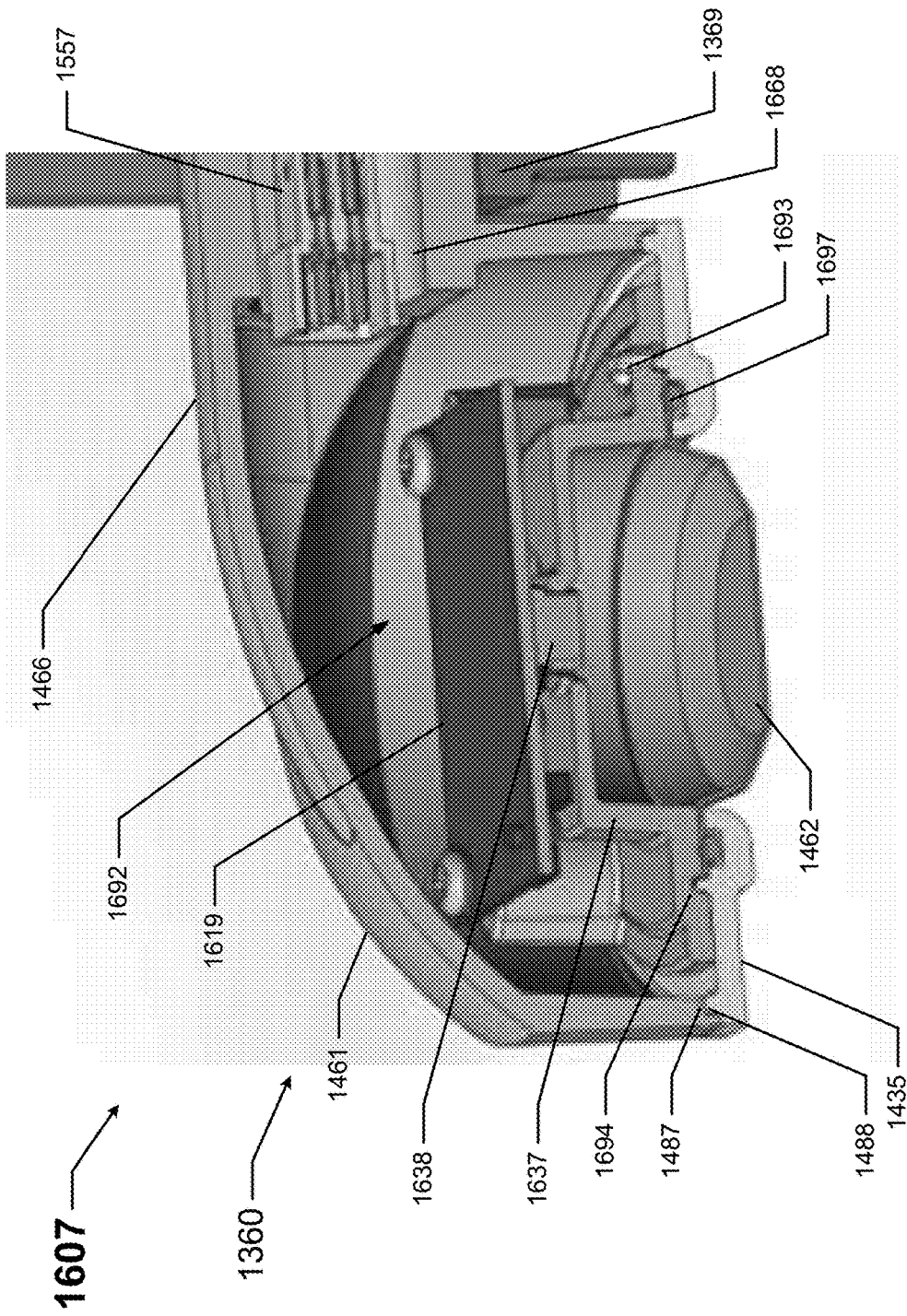
Figure 16H:
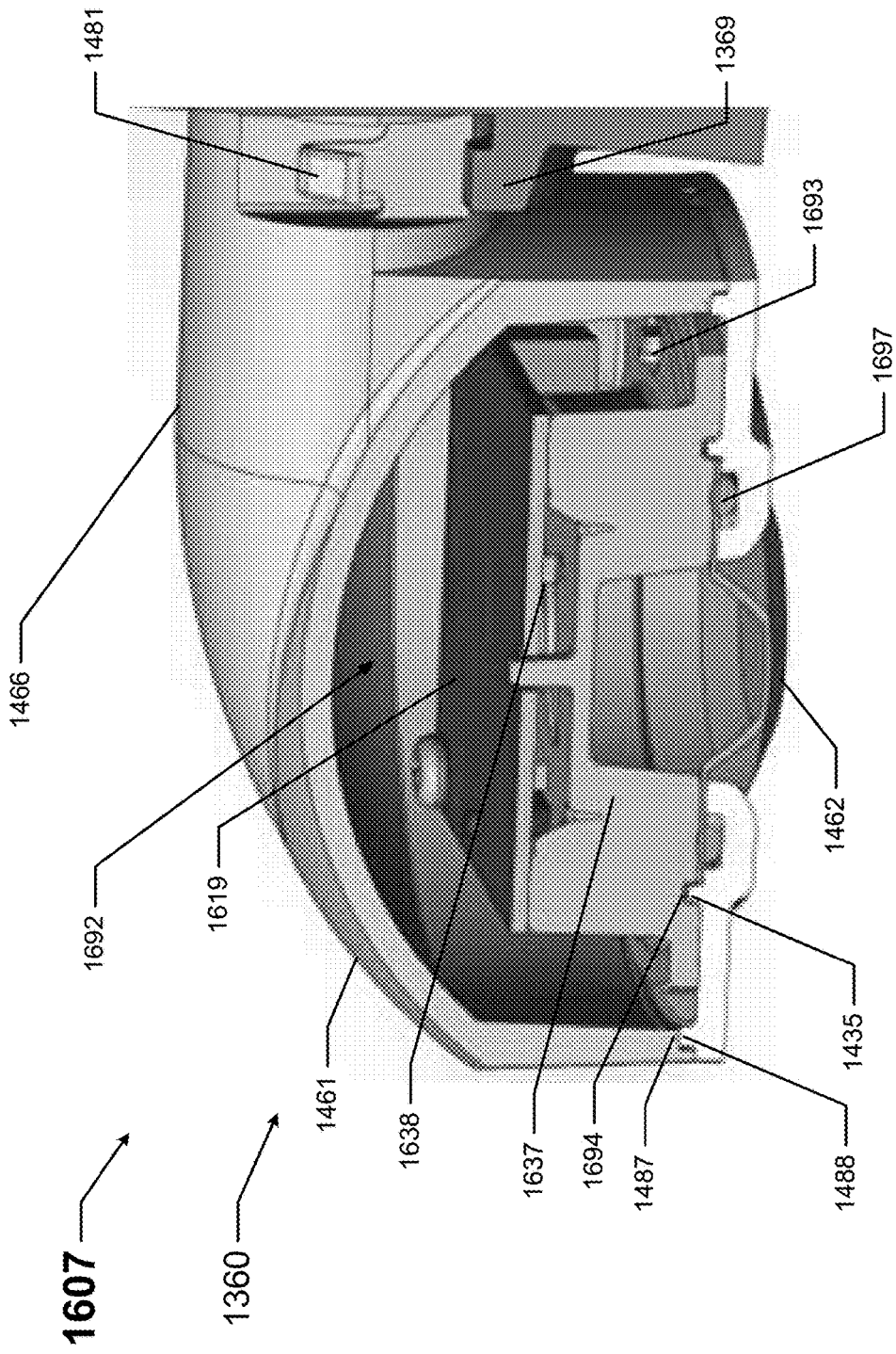

The sensor module 1360 continues to rotate in the same direction, as shown in FIG. 16E. Once spring tab 1481 clears channel 1598 and then the other side (in this case, the left side) of the platform 1585, the orientation of spring tab 1481 prevents rotation in the reverse direction (in this case, counter-clockwise) because the tab of the spring clip 1481 sticks out and abuts against the left side of the platform 1585. Similarly, continued rotation of the sensor module 1360 in the same direction (in this case, clockwise), also is prevented at a point where the tab of the spring clip 1482 sticks out and abuts against the right side of the platform 1585. In this way, the rotational range of motion of the sensor module 1360 is limited by spring clip 1481 and spring clip 1482.

The position of the spring clips on the extension 1466 can be configured to offer a limited range of motion of the sensor module 1360 relative to the housing 1303, or a greater range of motion. Similarly, the arrangement of the spring clips can have the center of the range of motion of the sensor module 1360 be vertical. Alternatively, the arrangement of the spring clips can have the center of the range of motion of the sensor module 1360 be offset from vertical. Further, at this stage, the retention rib 1484 remains engaged with channel 1589, continuing to prevent the sensor module 1360 from being pulled out and away from the mounting frame 1369.

When a user wants to remove the sensor module 1360 from the housing 1303, this can be accomplished without tools. For example, as shown in FIG. 16F, the sensor module 1360 can be rotated in either direction (in this case, clockwise) to the point where one of the spring tabs (in this case, spring tab 1481) is about to contact one side (in this case, the right side) of the platform 1585. When the user presses the tab of spring tab 1481 inward, and then continues to rotate the sensor module 1360 in the same direction as the tab of the spring tab continues to be pressed inward, the platform 1585 no longer interferes (makes contact) with spring tab 1481. This allows the sensor module 1360 to continue to rotate relative to the housing 1303 until the retention rib 1484 clears channel 1589. At that point, the sensor module 1360 can be pulled away from the housing, decoupling the sensor module 1360 from the housing 1303.

Because of the design of example sensor modules herein, such as shown in FIGS. 13A-16H, the sensor module 1360 can be coupled to and/or decoupled from the housing 1303 while the light fixture 1302 is operating without the risk of creating a source of ignition, adversely affecting the operation of the light fixture 1302, or otherwise causing a disruption. Further, whether the sensor module 1360 is coupled to the housing 1303 or not, when the light fixture 1302 is located in a hazardous environment, the light fixture 1302 complies with applicable standards for the hazardous location.

Further, sealing member 1497-1 and sealing member 1497-2 of the extension 1466 of the sensor module 1360 interact with the inner surface of coupling feature 1557 of the mounting feature 1369 to provide a friction fit to maintain the angular position of the sensor module 1360 relative to the housing 1303. In this way, the sensor module 1360 of the light fixture 1302 can be coupled to and decoupled from the mounting feature 1369 by a user (e.g., user 150) without the use of tools. Similarly, the position of the sensor module 1360 relative to the housing 1303 can be adjusted and fixed in place by a user without the use of tools.

In addition, as shown in FIGS. 14A-14C, 16G, and 16H, the various components of the sensor module 1360 are designed to minimize the tolerance stack up between such components to achieve the highest sensitivity out of the sensor 1638. The sensor module 1360 in this case includes a housing 1461 that forms a cavity 1692. Within the cavity 1692 is disposed a sensor 1638, a mount 1637 on which the sensor 1638 is disposed, and a circuit board 1619 disposed proximate to the sensor 1638. Also disposed in the cavity 1692 of the sensor module 1360 is part of the coupling feature 1557 (described above), which is also disposed within the channel 1668 of the extension 1466. In addition, a bezel 1435 is coupled to the bottom end of the housing 1461, and a lens 1462 is disposed within the center of the bezel 1435. The combination of the bezel 1435 and the lens 1462 encloses the cavity 1692 of the sensor module 1360.

In this case, the circuit board 1619 is coupled to and centered on the mount 1637 by the sensor 1638. Further, the mount 1637 and the lens 1462 are centered on the bezel 1435 by one or more locating rings 1488, which protrude upward from the bezel 1435 into a corresponding channel (e.g., channel 1487 in the housing 1461, channel 1694 in the mount 1637). A locating ring 1488 in the bezel 1435 and a corresponding channel in an adjacent component of the sensor module 1360 can be disposed along all or one or more discrete portions of the perimeter of such a component. As another example, as shown in FIG. 16H, a discrete protrusion 1693 from the top surface of the bezel 1435 can extend through an aperture in the mount 1637. In these ways, multiple components of the sensor module 1360 can be "keyed" so that adjacent components can only be assembled a limited number (e.g., one) of ways.

One or more sealing members 1697 can be used to provide an environmental seal between two or more components of the sensor module 1360. For example, as shown in FIGS. 16G and 16H, sealing member 1697 can be disposed within a channel in the top surface of the bezel 1435 to provide an environmental seal between the bezel 1435 and the mount 1637.

FIG. 17 shows a system 1700 that includes a light fixture 1702 and a sensor module 1760 in accordance with certain example embodiments. Specifically, the sensor module 1760 is directly coupled to an enclosure 1899 aside from the housing 1703 of the light fixture 1702, but where the sensor module 1760 is communicably coupled to the light fixture 1702. Referring to FIGS. 1-17, the enclosure 1899 in this case is an explosion-proof junction box having a housing 1803. The sensor module 1760 is coupled to the housing 1803 of the enclosure 1899 in a substantially similar way that the sensor modules described above can be coupled to the housing of a light fixture. Since the enclosure 1899 is an explosion-proof enclosure, the sensor module 1760 is coupled to the housing 1803 of the enclosure 1899 in such a way that the combination complies with applicable standards (e.g., NEMA 7) for hazardous environments.

The light fixture 1702 in this case can be substantially similar to the light fixtures described above, except that in this case the housing 1703 of the light fixture 1702 lacks a mounting feature (e.g., mounting feature 1369 of FIGS. 13A-16H above) to which the sensor module 1760 can be coupled. Instead, there is a communication link 1705 between the enclosure 1899 and the light fixture 1702, allowing communication between the sensor module 1760 and the light fixture 1702. For example, the enclosure 1899 can include its own controller (including a control engine, a communication module, and a transceiver) and other components (e.g., an antenna assembly) to allow for wired and/or wireless communication (using the communication links 1705) with the controller and its corresponding components of the light fixture 1702.

Example sensor modules described herein can have modular characteristics and enhance a network of light fixtures in a lighting system. For example, a sensor module that is coupled to one light fixture in a lighting system can measure one or more parameters. These measurements can be used by the light fixture to which the sensor module is coupled for the operation of that light fixture. In some cases, these measurements can also be transmitted to one or more other light fixtures, a user, a network manager, and/or other components of the lighting system. For example, one or more other light fixtures of the system can use these measurements for operation of those other light fixtures.

Further, a light fixture that is configured to receive an example sensor module can be flexible as to the one or more parameters measured by a sensor module. For example, a light fixture, when coupled to an example sensor module that measures ambient light, can automatically recognize the measurements for ambient light provided by the sensor module and operate accordingly using those measurements. If a user then swaps the sensor module that measures ambient light with a different sensor module that measures movement (occupancy), the light fixture can automatically recognize the measurements for movement provided by the sensor module and operate accordingly using those measurements.

Example embodiments can allow for more reliable and efficient light fixtures, particularly when those light fixtures are located in hazardous environments. Example embodiments, allow for sensor modules to be integrated with (e.g., disposed within, coupled to an exterior of) a light fixture while allowing the light fixture to comply with applicable standards. These integral sensor modules allow for a light fixture to work with a controller and/or other components of the light fixture. Example embodiments can further provide a user with options to improve the operational efficiency and prolong the useful life of a light fixture or components thereof. Example embodiments can also allow for interchangeable and modular configurations in a lighting system.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:
1. A lighting system, comprising:
 a light fixture located in a hazardous environment, wherein the light fixture comprises a controller; and
 a sensor module communicably coupled to the controller of the light fixture, wherein the sensor module com- prises a sensor module housing and a sensor disposed within the sensor module housing, wherein the sensor module housing comprises a first coupling feature that is configured to couple to a second coupling feature of a hazardous location enclosure, wherein the first coupling feature comprises at least one sealing member disposed within at least one first channel in an exterior surface of the sensor module housing, wherein the hazardous location enclosure and the sensor module, when coupled to each other, comply with applicable standards for the hazardous environment, wherein the at least one sealing member is configured to contact the hazardous location enclosure without engaging the second coupling feature of the hazardous location enclosure when the sensor module is coupled to the hazardous location enclosure.

2. The lighting system of claim 1, wherein the sensor module is intrinsically safe to allow reliable operation of the sensor module in the hazardous environment.

3. The lighting system of claim 1, wherein the hazardous location enclosure is a light fixture housing of the light fixture, wherein the light fixture housing comprises the second coupling feature, wherein the first coupling feature of the sensor module couples to the second coupling feature.

4. The lighting system of claim 3, further comprising:
a safety barrier that limits an amount of power delivered from the light fixture housing to the sensor device.

5. The lighting system of claim 4, wherein the safety barrier is a capacitive barrier.

6. The lighting system of claim 3, wherein the light fixture continues to operate as the sensor module is coupled to and decoupled from the light fixture housing of the light fixture.

7. The lighting system of claim 1, wherein the sensor module further comprises an extension that forms a channel, wherein the channel has disposed therein an electrical connection between the hazardous location enclosure and the sensor module, wherein the channel is encapsulated.

8. The lighting system of claim 1, wherein a mounting feature of the hazardous location enclosure comprises a second channel, wherein the second channel has disposed therein an electrical connection between the hazardous location enclosure and the sensor module, wherein the second channel is encapsulated.

9. The lighting system of claim 1, wherein the sensor module housing is configured to withstand impact requirements for the hazardous location enclosure.

10. The lighting system of claim 1, further comprising:
a mechanical bridge device disposed between the light fixture and the sensor device.

11. The lighting system of claim 1, wherein the first coupling feature of the sensor module comprises a retention rib that engages a first channel of the mounting feature, wherein the retention rib, when engaged with the first channel, allows for rotational movement of the sensor module relative to the housing and prevents decoupling of the sensor module from the first mounting feature.

12. The lighting system of claim 11, wherein the first coupling feature of the sensor module further comprises at least one spring tab that engages a platform and a second channel of the first mounting feature, wherein the at least one spring tab, when engaged with the platform, limits the rotational movement of the sensor module relative to the first fixture housing.

13. The lighting system of claim 12, wherein the first coupling feature of the sensor module further comprises at least one sealing member that engages an inner surface of a second coupling feature of the first mounting feature, wherein the at least one sealing member, when engaged with the inner surface of the second coupling feature, uses friction to maintain a position of the sensor module relative to the first fixture housing.

14. The lighting system of claim 1, wherein the first coupling feature of the sensor module comprises a first aperture that engages a spring-activated pin of the first mounting feature, wherein the spring-activated pin, when engaged with the first aperture, prevents the sensor module from decoupling from the first fixture housing.

15. The lighting system of claim 14, wherein the first mounting feature further comprises a second aperture that traverses therethrough, wherein the second aperture receives a securing member that abuts against the sensor module to prevent the sensor module from rotating relative to the first fixture housing.

16. The lighting system of claim 1, wherein the sensor module is coupled to, decoupled from, and adjusted relative to the first fixture housing without tools.

17. The lighting system of claim 1, wherein the sensor module is decoupled from the first fixture housing and coupled to a second mounting feature of a second light fixture, wherein the sensor module, when coupled to the second mounting feature, provides measurements of at least one parameter to the first light fixture and the second light fixture for operation of the first light fixture and the second light fixture.

18. A lighting system, comprising:
a light fixture located in a hazardous environment, wherein the light fixture comprises a controller and a first coupling feature disposed on a light fixture housing; and
a sensor module communicably coupled to the controller of the light fixture, wherein the sensor module is also electrically and mechanically coupled to the light fixture housing, wherein the sensor module comprises a sensor module housing and a sensor disposed within the sensor module housing, wherein the sensor module housing comprises a second coupling feature that electrically and mechanically couples to the first coupling feature,
wherein the first coupling feature comprises a physical barrier and an electrical connector, wherein the physical barrier prevents the light fixture from being compromised if the sensor module fails when the sensor module is coupled to the light fixture, wherein the electrical connector protrudes through the physical barrier.

19. A lighting system, comprising:
a light fixture located in a hazardous environment, wherein the light fixture comprises a controller and a first coupling feature disposed on a light fixture housing; and
a sensor module communicably coupled to the controller of the light fixture, wherein the sensor module is also electrically and mechanically coupled to the light fixture housing, wherein the sensor module comprises a sensor module housing and a sensor disposed within the sensor module housing, wherein the sensor module housing comprises a second coupling feature that electrically and mechanically couples to the first coupling feature,
wherein the first coupling feature couples to and decouples from the second coupling feature without use of tools,
wherein the first coupling feature and the second coupling feature allow for a user to adjust a position of the sensor module relative to the light fixture housing within a range of positions when the sensor module is coupled to the light fixture while still complying with applicable standards for the hazardous environment.

* * * * *